US008789038B2

(12) United States Patent
Kaku

(10) Patent No.: US 8,789,038 B2
(45) Date of Patent: Jul. 22, 2014

(54) INFORMATION PROCESSING DEVICE, INFORMATION PROCESSING METHOD, AND COMPUTER READABLE MEDIUM WITH FUNCTION DISABLING

(75) Inventor: Shinya Kaku, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 365 days.

(21) Appl. No.: 13/151,592

(22) Filed: Jun. 2, 2011

(65) Prior Publication Data

US 2011/0299121 A1  Dec. 8, 2011

(30) Foreign Application Priority Data

Jun. 7, 2010 (JP) .................................. 2010-129848

(51) Int. Cl.
*G06F 9/445* (2006.01)
(52) U.S. Cl.
USPC ........................... 717/176; 717/124; 713/176
(58) Field of Classification Search
USPC .......................................................... 717/176
See application file for complete search history.

(56) References Cited

U.S. PATENT DOCUMENTS

| 6,115,471 | A * | 9/2000 | Oki et al. ...................... 713/176 |
| 2004/0109188 | A1 | 6/2004 | Akiyoshi et al. |
| 2007/0234298 | A1* | 10/2007 | Hirai et al. ..................... 717/124 |
| 2009/0091787 | A1 | 4/2009 | Naitoh |
| 2009/0323097 | A1* | 12/2009 | Iizuka ............................ 358/1.14 |
| 2010/0262959 | A1* | 10/2010 | Bruno et al. .................. 717/171 |

FOREIGN PATENT DOCUMENTS

| JP | 2002-196930 A | 7/2002 |
| JP | 2004-129246 A | 4/2004 |
| JP | 2005-157411 A | 6/2005 |
| JP | 2008-021048 A | 1/2008 |
| JP | 2009-093228 A | 4/2009 |
| JP | 2009-134610 A | 6/2009 |
| JP | 2009-140347 A | 6/2009 |
| JP | 2009-258905 A | 11/2009 |

OTHER PUBLICATIONS

Office Action dated Apr. 17, 2012, issued in corresponding Japanese Patent Application No. 2010-129848, and an English Translation thereof. (7 pages).

* cited by examiner

*Primary Examiner* — Don Wong
*Assistant Examiner* — Roberto E Luna
(74) *Attorney, Agent, or Firm* — Buchanan Ingersoll & Rooney PC

(57) ABSTRACT

An information processing device for installing and executing an application program which enables at least one of a plurality of information processing functions comprises: a storage part for storing functional restriction information configured for each of a plurality of users is defined; an obtaining part for obtaining, based on the functional restriction information, common functional restriction information in which restriction on use of at least one of the plurality of information processing functions except for a common available function commonly available for all the plurality of users is defined; a determination part, in installation of the application program, for determining whether or not a command contained in the application program enables an unavailable function restricted with the common functional restriction information by analyzing the command; a rewrite part for rewriting the command; and an installation part for installing the application program containing the command rewritten by the rewrite part.

18 Claims, 18 Drawing Sheets

INFORMATION PROCESSING DEVICE 1

INFORMATION PROCESSING DEVICE, INFORMATION PROCESSING METHOD, AND COMPUTER READABLE MEDIUM WITH FUNCTION DISABLING

This application is based on the application No. 2010-129848 filed in Japan, the contents of which are hereby incorporated by reference.

BACKGROUND OF THE INVENTION

1. Field of the Invention

The present invention relates to an information processing device, an information processing method, and a computer readable medium. The present invention more specifically relates to a technique of installing and executing a program enabling an information processing function.

2. Description of the Background Art

Information processing devices called as MFPs (multi function peripherals) placed in an office environment have multiple functions including a function for copying, printing, scanning, faxing and transmitting e-mails. This type of conventional information processing device stores therein a standard application program for allowing at least one information processing function to operate installed in advance. As the user makes an operation to select one of the functions, the standard application program is executed in the information processing device. The information processing function selected by the user operates, and a job is executed.

In recent years, in order to promote user friendliness with diversification of an application program executable in the information processing device, the information processing device has been capable of storing therein a variety of application programs installed. The variety of application programs is different from the standard application program installed in advance. This known technique is introduced for example in Japanese Patent Application Laid-Open No. JP2004-129246 A and in Japanese Patent Application Laid-Open No. JP2009-93228 A. Especially in these days, use of the script language allows the program to be developed relatively easy. So, the user of the information processing device may create the application program and installs the created program on the information processing device, for example.

The information processing device installed at a place such as an office environment is required to improve security to prevent leaking of data. With the current information processing device, restriction on access to an outside server and/or restriction on transmission of data by e-mail are set for each user. Functional restriction information in which functional restriction on use of each information processing function is defined for each user is registered in advance with the information processing device. As the user logs into the information processing device, the information processing device transits to a state where at least one information processing function is available based on the functional restriction information corresponding to the logged-in user.

As described above, it is assumed that the user of the information processing device creates the application program for allowing each information processing function to operate and installs the created application program on the information processing device, for example. In such a case, the application program to be installed should be created as a program which allows various types of processes to execute with causing the functional restriction information set for each user to reflect appropriately. A programmer needs to sufficiently consider what information is contained in the functional restriction information registered in advance with the information processing device when creating the program. The functional restriction information set for each user is registered with the information processing device and is updated by an administrator when necessary. The application program installed on the information processing device should be created as a program capable of reflecting the updated data quickly and appropriately when update is made to the functional restriction information registered with the information processing device. Thus, the programmer is generally required to develop specified process sequences for creation of the application program to be installed on the information processing device. The specified process sequences are not only the process sequence of allowing each information processing function to operate but also the process sequence of causing the functional restriction information set for each user to reflect correctly. This involves a problem that the programmer is not allowed to create the program efficiently.

Some application programs created by the programmer have bugs. Such application program may enable even the function restricted the use with the functional restriction information. In order to prevent the restricted function from being enabled, the administrator generally performs test operation of the application program created by the programmer, and validates whether or not operation is realized properly by the application program based on the functional restriction information of each user. Thus, a problem that an operation load placed on the administrator is heavy is encountered.

SUMMARY OF THE INVENTION

The present invention is intended to solve the above problems. Thus, the present invention is intended to provide an information processing device, an information processing method and a computer readable medium capable of realizing efficient creation of a program by reducing an operation load placed on a programmer to create the program to install, and capable of reducing an operation load placed on an administrator.

First, the present invention is directed to an information processing device for installing and executing an application program which enables at least one of a plurality of information processing functions.

According to one aspect of the information processing device, the information processing device, comprises: a storage part for storing functional restriction information in which functional restriction on use of the plurality of information processing functions configured for each of a plurality of users is defined; an obtaining part for obtaining, based on the functional restriction information, common functional restriction information in which restriction on use of at least one of the plurality of information processing functions except for a common available function commonly available for all of the plurality of users is defined; a determination part, in installation of the application program, for determining whether or not a command contained in the application program enables an unavailable function restricted with the common functional restriction information by analyzing the command; a rewrite part for rewriting the command contained in the application program to disable the unavailable function restricted with the common functional restriction information when the command enabling the unavailable function restricted with the common functional restriction information is contained in the application program; and an installation part for installing the application program containing the command rewritten by the rewrite part.

Second, the present invention is directed to an information processing device for installing and executing an application program which enables at least one of a plurality of information processing functions.

According to one aspect of the information processing device, the information processing device, comprises: a storage part for storing functional restriction information, in which functional restriction on use of the plurality of information processing functions configured for each of a plurality of users is defined, in a user storage region assigned for each of the plurality of users; a determination part, in installation of the application program on the user storage region of a specified user, for reading the functional restriction information in the user storage region of the specified user and analyzing a command contained in the application program, thereby determining whether or not the command contained in the application program enables a specific function restricted with the functional restriction information corresponding to the specified user; a rewrite part for rewriting the command contained in the application program to disable the specific function restricted with the functional restriction information corresponding to the specified user when the command enabling the specific function restricted with the functional restriction information is contained in the application program; and an installation part for installing the application program containing the command rewritten by the rewrite part on the user storage region of the specified user.

Third, the present invention is directed to an information processing method of installing and executing an application program which enables at least one of a plurality of information processing functions.

According to an aspect of the information processing method, the information processing method, comprises the steps of: (a) storing functional restriction information in which functional restriction on use of the plurality of information processing functions configured for each of a plurality of users is defined; (b) obtaining, based on the functional restriction information, common functional restriction information in which restriction on use of at least one of the plurality of information processing functions except for a common available function commonly available for all of the plurality of users is defined; (c) determining, in installation of the application program, whether or not a command contained in the application program enables an unavailable function restricted with the common functional restriction information by analyzing the command; (d) rewriting the command contained in the application program to disable the unavailable function restricted with the common functional restriction information when the command enabling the unavailable function restricted with the common functional restriction information is contained in the application program; and (e) installing the application program containing the command rewritten to disable the unavailable function restricted with the common functional restriction information.

Forth, the present invention is directed to an information processing method of installing and executing an application program which enables at least one of a plurality of information processing functions.

According to one aspect of the information processing method, the information processing method, comprises the steps of: (a) storing functional restriction information, in which functional restriction on use of the plurality of information processing functions configured for each of a plurality of users is defined, in a user storage region assigned for each of the plurality of users; (b) reading the functional restriction information in the user storage region of a specified user and analyzing a command contained in the application program, thereby determining whether or not the command enables a specific function restricted with the functional restriction information corresponding to the specified user in installation of the application program on the user storage region of the specified user; (c) rewriting the command contained in the application program to disable the specific function restricted with the functional restriction information corresponding to the specified user when the command enabling the specific function restricted with the functional restriction information is contained in the application program; and (d) installing the application program containing the command rewritten to disable the specific function restricted with the functional restriction information on the user storage region of the specified user.

Fifth, the present invention is directed to a computer readable recording medium on which a program is recorded. The program installs and executes an application program enabling at least one of a plurality of information processing functions of an information processing device.

According to an aspect of the computer readable recording medium, the program recorded on the recording medium causes the information processing device to execute the steps of: (a) storing functional restriction information in which functional restriction on use of the plurality of information processing functions configured for each of a plurality of users is defined; (b) obtaining, based on the functional restriction information, common functional restriction information in which restriction on use of at least one of the plurality of information processing functions except for a common available function commonly available for all of the plurality of users is defined; (c) determining, in installation of the application program, whether or not a command contained in the application program enables an unavailable function restricted with the common functional restriction information by analyzing the command; (d) rewriting the command contained in the application program to disable the unavailable function restricted with the common functional restriction information when the command enabling the unavailable function restricted with the common functional restriction information is contained in the application program; and (e) installing the application program containing the command rewritten to disable the unavailable function restricted with the common functional restriction information.

Sixth, the present invention is directed to a computer readable recording medium on which a program is recorded. The program installs and executes an application program enabling at least one of a plurality of information processing functions of an information processing device.

According to an aspect of the computer readable recording medium, the program recorded on the recording medium causes the information processing device to execute the steps of: (a) storing functional restriction information, in which functional restriction on use of the plurality of information processing functions configured for each of a plurality of users is defined, in a user storage region assigned for each of the plurality of users; (b) reading the functional restriction information in the user storage region of a specified user and analyzing a command contained in the application program, thereby determining whether or not the command enables a specific function restricted with the functional restriction information corresponding to the specified user in installation of the application program on the user storage region of the specified user; (c) rewriting the command contained in the application program to disable the specific function restricted with the functional restriction information corresponding to the specified user when the command enabling the specific function restricted with the functional restriction information is contained in the application program; and (d) installing the application program containing the command rewritten to disable the specific function restricted with the functional restriction information on the user storage region of the specified user.

DESCRIPTION OF THE PRESENT PREFERRED EMBODIMENTS

Figure 1:
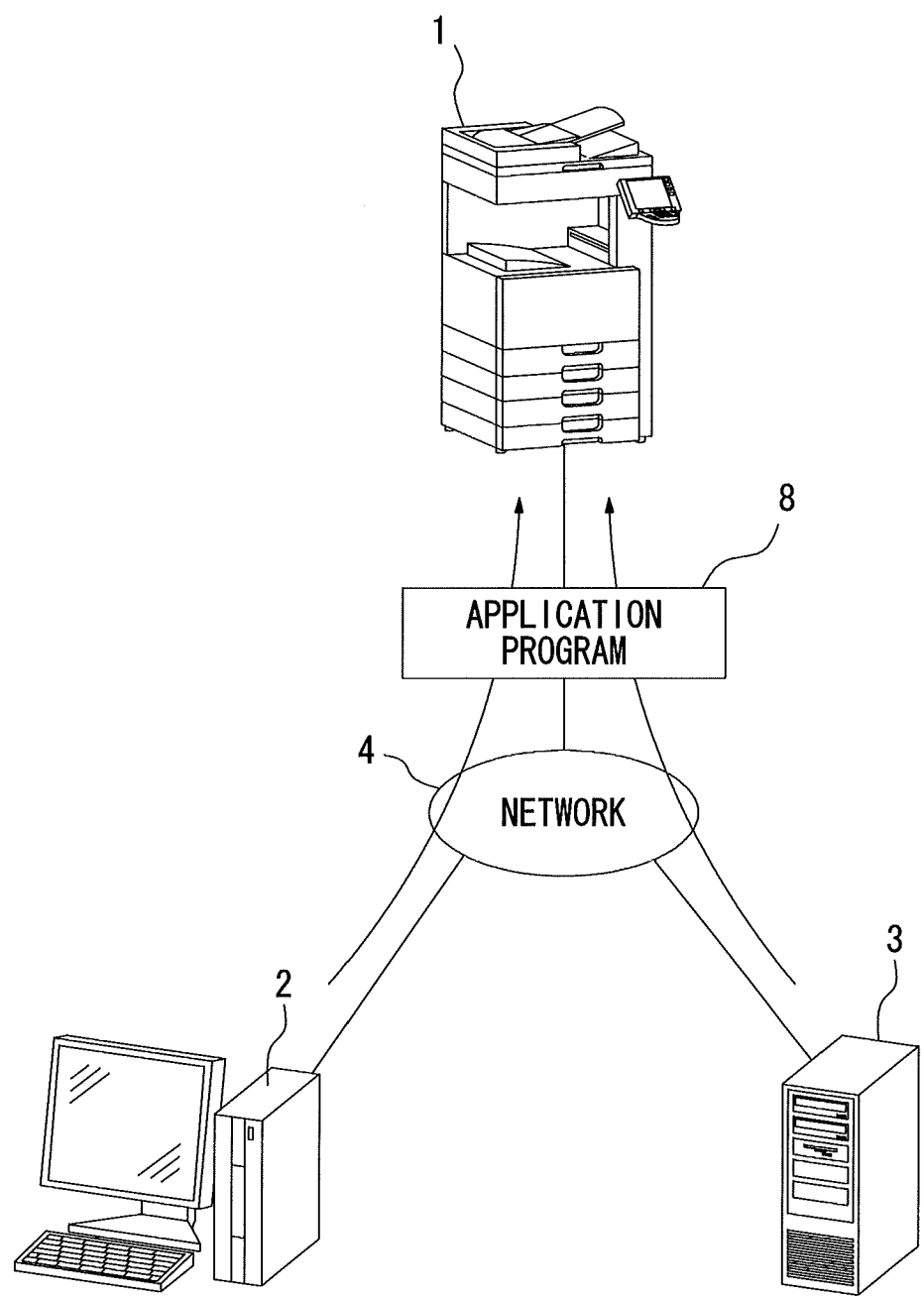
FIG. 1 shows an exemplary network configuration in which an information processing device is included.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary network configuration in which an information processing device 1 installed at a place such as an office environment is included. The information processing device 1 is connected with a computer 2 and a server 3 through a network 4 such as a so-called LAN. Other devices besides the computer 2 and the server 3 may also be connected to the network 4.

The information processing device 1 is a device called by a name such as an MFP (multi function peripheral) with multiple information processing functions including a copy function, a print function, a scan function, a fax function and a mail transmission function (hereafter also referred to as "functions"). Each of the functions is enabled in response to execution of an application program installed in advance on the information processing device 1. After, for example, logging into the information processing device 1 by making an operation to log in, a user makes an operation to select the application program installed in advance on the information processing device 1 and give an instruction on execution of the application program. In response to the operation, the information processing device 1 executes the application program selected by the user therein, and enables at least one of the functions corresponding to the application program.

The information processing device 1 receives an application program 8 from, for example, the computer 2 or the server 3 through the network 4, and installs the received application program 8. The application program 8 is created in a script language by the user of the information processing device 1 or the programmer who is not the user. The application program 8 is created as a program which enables at least one of the multiple functions provided by the information processing device 1.

There are various types of application programs 8. By way of example, there is a program that is a sequence of instructions written to perform a specified task. The specified task is to allow the scan function to operate to read a document, and to allow the mail transmission function to operate thereafter to transmit an e-mail to which image data generated by the scan function is attached to a designated address. It is assumed that the user of the information processing device 1 creates this kind of application program 8, and installs the application program 8 in advance on the information processing device 1. The user then makes an operation to select the installed application program 8 and give an instruction when using the information processing device 1. In response to the user's operation, the information processing device 1 performs an operation to read the document and that to transmit the e-mail in a series of operations, thereby improving the convenience thereof in such a case. The application program 8 is not limited to the program as referred hereinabove. Different types of more than one application programs 8 may be installed on the information processing device 1.

Figure 2:
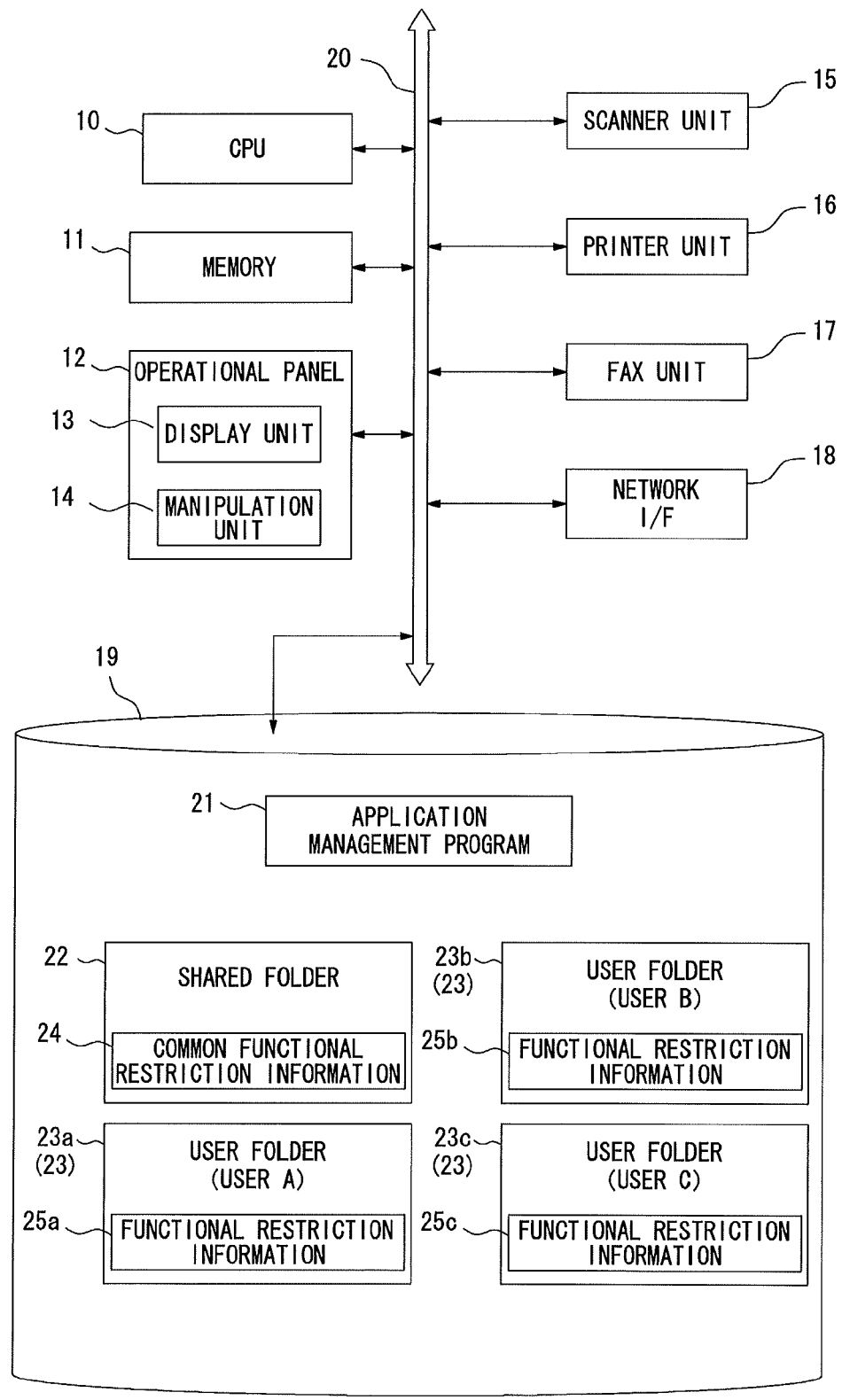
FIG. 2 is a block diagram showing the hardware configuration of an information processing device.

FIG. 2 is a block diagram showing the hardware configuration of the information processing device 1. The information processing device 1 includes a CPU 10, a memory 11, an operational panel 12, a scanner unit 15, a printer unit 16, a fax unit 17, a network interface 18 and a storage device 19 that are connected to each other to allow data input and output between these parts through a data bus 20. The CPU 10 executes the various types of programs. The memory 11 stores therein data such as temporary data with execution of the program by the CPU 10. The operational panel 12 is a user interface when the information processing device 1 is operated by the user. The scanner unit 15 reads a document. The printer unit 16 produces a printed matter. The fax unit 17 transmits and receives fax data. The network interface 18 is for connecting the information processing device 1 to the network 4, and the storage device 19 is formed from a nonvolatile storage device such as a hard disk drive. The operational panel 12 includes a display unit 13 on which various types of information are displayed to the user and a manipulation unit 14 which receives a range of input operations made by the user. The display unit 13 is formed from a device such as a liquid crystal display. The manipulation unit 14 has a plurality of operation keys including both touch panel keys arranged on a screen of the display unit 13 and push-button keys arranged around the screen, for example.

The storage device 19 stores therein an application management program 21 which is a factory-installed program. The storage device 19 includes a shared folder 22 that is a shared storage region commonly available for a plurality of users who use the information processing device 1 and a user folder 23 that is a user dedicated storage region set for each of the plurality of users individually.

In order to simplify an explanation, three of users A, B and C are registered as users of the information processing device 1 in the first preferred embodiment as an example. The shared folder 22 is the storage region that each of the users A, B and C is allowed to access with own choice. Each user is allowed to use the program, data and/or information stored in the shared folder 22 by accessing.

The user folder 23 includes a user folder 23a assigned to the user A, a user folder 23b assigned to the user B and a user folder 23c assigned to the user C. The user folder 23a is accessible by only the user A. The user A is allowed to use the program, data and/or information stored in the user folder 23a with own choice by accessing. The users B and C are not allowed to access and use the program, data and/or information stored in the user folder 23a. The same applies to the other user folders 23b and 23c. Each of those user folders 23b and 23c allows access by only the user B or the user C.

The user folders 23a, 23b and 23c stores therein functional restriction information 25a, 25b and 25c, each of them corresponding to the users A, B and C. The functional restriction information 25a, 25b and 25c are configured for individual users, the user A, B and C, by the administrator of the information processing device 1, for example. The functional restriction information 25a, 25b and 25c are information in which functional restrictions on use of the information processing functions with the information processing device 1 are defined. To be more specific, the functional restriction on use of the information processing functions with the information processing device 1 by the user A is defined in the functional restriction information 25a. The functional restriction on use of the information processing functions with the information processing device 1 by the user B is defined in the functional restriction information 25b. The functional restriction on use of the information processing functions with the information processing device 1 by the user C is defined in the functional restriction information 25c.

The shared folder 22 stores therein common functional restriction information 24 shared by each user A, B and C. The common functional restriction information 24 is automatically configured based on, for instance, the respective functional restriction information 25a, 25b and 25c corresponding to the users A, B and C. The common functional restriction information 24 is information in which functional restriction on use of the information processing functions with the information processing device 1 by each of the users A, B and C by accessing the shared folder 22 is defined. The common functional restriction information 24 is configured to restrict the use of the information processing functions except for the function commonly available for every user A, B and C.

Figure 3:
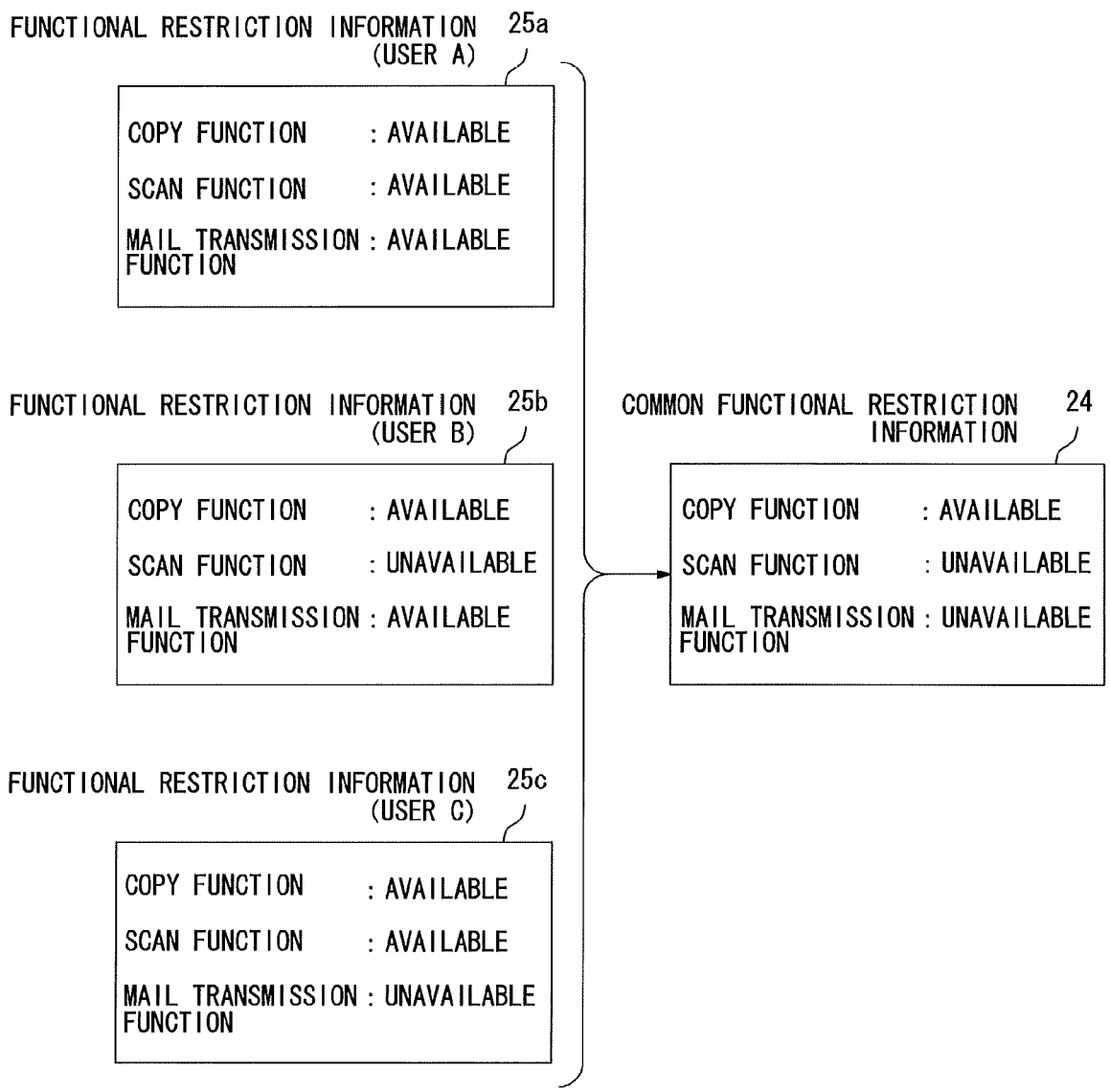
FIG. 3 shows a relationship between functional restriction information configured for each user and common functional restriction information shared by every user.

FIG. 3 shows a relationship between the functional restriction information 25a, 25b and 25c corresponding to the respective users and the common functional restriction information 24 shared by every user. In the example of FIG. 3, the functional restriction information 25a, corresponding to the user A, stored in the user folder 23a shows that all the functions, the copy function, the scan function and the mail transmission function, are available. The functional restriction information 25b, corresponding to the user B, stored in the user folder 23b shows that some functions, the copy function and the mail transmission function, are available but the scan function is restricted and unavailable. The functional restriction information 25c, corresponding to the user C, stored in the user folder 23c shows that some functions, the copy function and the scan function, are available but the mail transmission function is restricted and unavailable. Each of the functional restriction information 25a, 25b and 25c contains information showing the availability of each of the multiple information processing functions provided by the information processing device 1. In FIG. 3, however, to simplify the explanation, only three functions, the copy function, the scan function and the mail transmission function, are cited as an example.

The shared folder 22 stores therein the common functional restriction information 24. The common functional restriction information 24 is generated based on the above-described functional restriction information 25a, 25b and 25c configured for each user A, B and C individually. The common functional restriction information 24 is generated as information for restricting use of the information processing function of the information processing device 1 besides the function commonly available for every user of the plurality of users A, B and C as referred to above. Referring to the respective functional restriction information 25a, 25b and 25c of the users A, B and C of FIG. 3, the function commonly available for every user, each of the users A, B and C, is only the copy function. The common functional restriction information 24 is determined to configure the copy function to be available for every user and the use of the scan function and the mail transmission function to be restricted. The common functional restriction information 24 shows that the scan function and the mail transmission function are unavailable.

Figure 4:
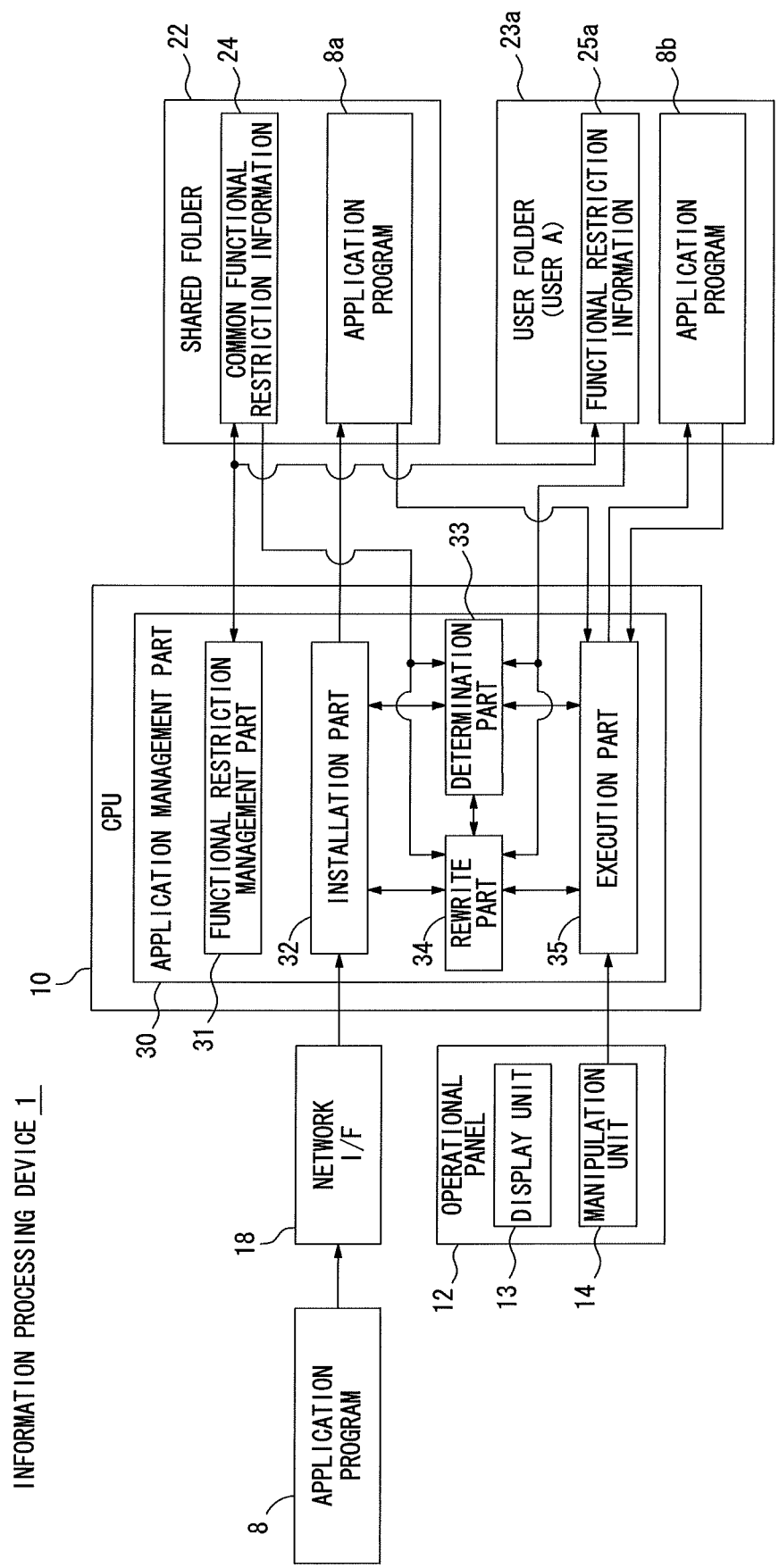
FIG. 4 is a block diagram showing the functional configuration realized by execution of an application management program by a CPU.

The CPU 10 reads and executes the application management program 21 when the information processing device 1 is turned on. FIG. 4 is a block diagram showing the functional configuration of the CPU 10 realized by execution of the application management program 21 by the CPU 10. Only the user folder 23a corresponding to the user A is shown, and the respective user folders 23b and 23c corresponding to the users B and C are not shown in FIG. 4.

The CPU 10 executes the application management program 21, thereby functioning as an application management part 30 as shown in FIG. 4. The application management part 30 is resident and put into operation during a period of turning on the information processing device 1, for example. The application management part 30 further functions as a functional restriction management part 31, an installation part 32, a determination part 33, a rewrite part 34 and an execution part 35. Each part is described in detail below.

The functional restriction management part 31 manages the functional restriction information 25a, 25b and 25c in the respective user folders 23a, 23b and 23c. As the functional restriction information 25a, 25b and 25c corresponding to the respective users A, B and C are newly configured by the administrator of the information processing device 1, for example, the functional restriction management part 31 newly registers, based on the configuration operation by the administrator, the functional restriction information 25a, 25b and 25c in the respective user folders 23a, 23b and 23c corresponding to the users A, B and C. In response to the registration of the functional restriction information 25a, 25b and 25c in the respective user folders 23a, 23b and 23c, the functional restriction management part 31 generates the common functional restriction information 24. The common functional restriction information 24 is stored in the shared folder 22.

The functional restriction information 25a, 25b and 25c configured in advance for each user A, B and C may be updated by the administrator. In the event of update, the functional restriction management part 31 identifies, based on the operation to update by the administrator, the user whose functional restriction information is being updated, and updates the functional restriction information in his or her user folder. When, for example, the functional restriction information 25a of the user A is updated by the administrator, the functional restriction management part 31 updates the functional restriction information 25a in the user folder 23a. With updating at least one of the functional restriction information 25a, 25b and 25c in the respective user folders 23a, 23b and 23c, the functional restriction management part 31 updates the common functional restriction information 24 in the shared folder 22.

The functional restriction management part 31 updates the common functional restriction information 24 in the shared folder 22 every time at least one of the functional restriction information 25a, 25b and 25c configured individually for each user A, B and C is updated. The shared folder 22 always stores therein the common functional restriction information 24 to which the information of the functional restriction information 25a, 25b and 25c configured individually for each user A, B and C is reflected.

The administrator may make an operation to register and/or to update one of the functional restriction information 25a, 25b and 25c with the operational panel 12 of the information processing device 1 or with the computer 2 used by the administrator to remotely operate.

The installation part 32 installs the new application program 8 on the information processing device 1. The installation part 32 installs the application program 8, for example, received via the network interface 18 on the shared folder 22 so that all users may use the application program 8. After obtaining the application program 8 to install, the installation part 32 puts the determination part 33 into operation.

The determination part 33 analyzes a plurality of commands contained in the application program, thereby determining whether or not the application program enables the function restricted with the common functional restriction information 24 or the functional restriction information 25a, 25b or 25c. The determination part 33 analyzes the plurality of commands contained in the application program 8 to be installed on the information processing device 1 in installation of the application program 8, and determines whether or not the command enables the function restricted with the common functional restriction information 24 is contained. When the application program 8 to be installed contains the command enabling the function restricted with the common functional restriction information 24, the determination part 33 puts the rewrite part 34 into operation.

The rewrite part 34 rewrites a predetermined command contained in the application program. The rewrite part 34 rewrites the predetermined command contained in the application program 8 in the installation of the application program 8. More specifically, the rewrite part 34 rewrites the command, enables the function restricted with the common functional restriction information 24, of the plurality of commands contained in the application program 8 as another command which disables the function restricted with the common functional restriction information 24. The application program 8 to be installed is rewritten as a program contains the plurality of commands, each of them enables only the function commonly available for every user of the plurality of users A, B and C.

The installation part 32 installs an application program 8a containing the command rewritten by the rewrite part 34 as referred to above on the shared folder 22. The application program 8a is installed on the shared folder 22 as the program capable of enabling only the function commonly available for every user of the plurality of users A, B and C.

Figure 5:
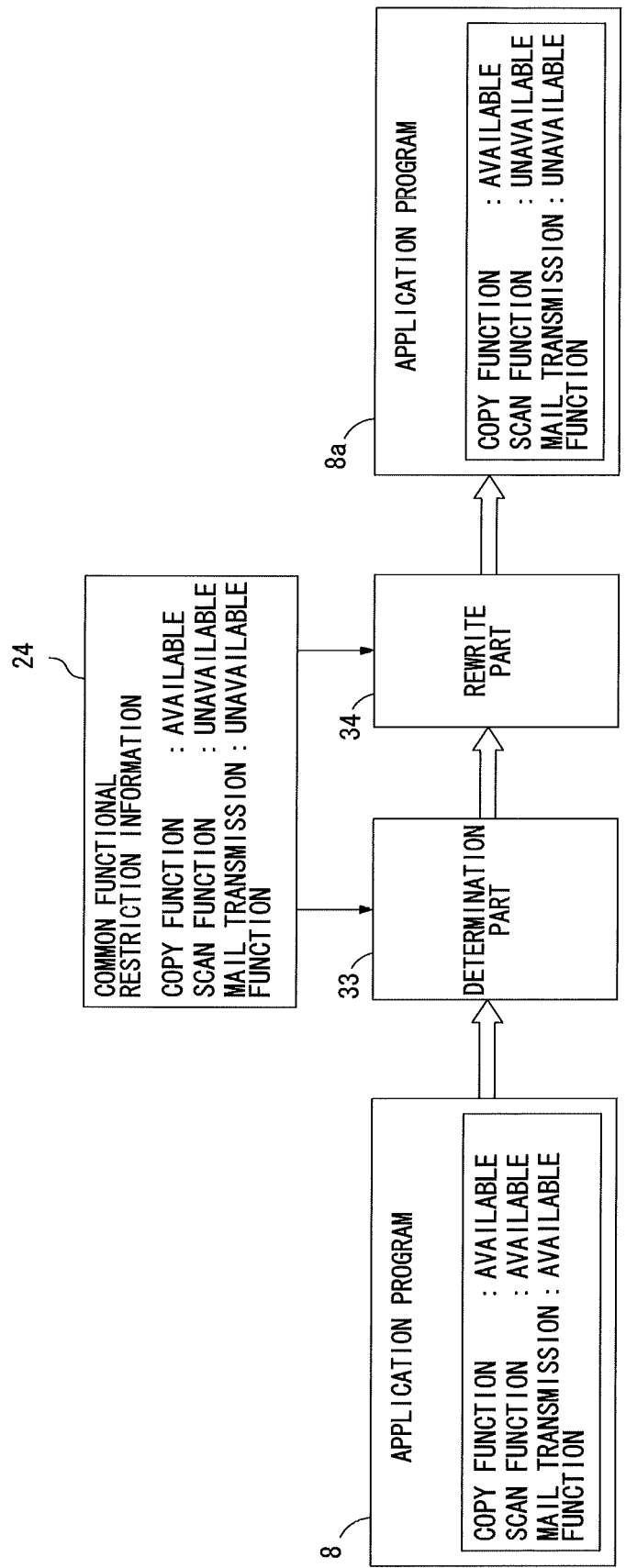
FIG. 5 shows exemplary operations of a determination part and a rewrite part in installation of an application program.

FIG. 5 shows exemplary operations of the determination part 33 and the rewrite part 34 in the installation of the application program 8. In the example of FIG. 5, the application program 8 to be installed enables the copy function, the scan function and the mail transmission function. The determination part 33 analyzes the application program 8, thereby knowing the program enables three of the copy function, the scan function and the mail transmission function in this case. The determination part 33 obtains the common functional restriction information 24 in the shared folder 22, and determines whether or not the function enabled by the application program 8 is restricted with the common functional restriction information 24. In the example of FIG. 5, the scan function and the mail transmission function enabled by the application program 8 correspond to the functions restricted with the common functional restriction information 24.

In such a case, the rewrite part 34 is put into operation to function after the determination part 33, and rewrites the command contained in the program so that the application program 8 matches the common functional restriction information 24. To be more specific, the command allowing the scan function to operate is rewritten as another command not allowing the scan function to operate, and the command allowing the mail transmission function to operate is rewritten as another command not allowing the mail transmission function to operate. In response to the rewrite as cited above, the application program 8 enabling three of the copy function, the scan function and the mail transmission function is rewritten in its installation as the application program 8a with the command enabling only the copy function. Referring to FIG. 5, the application program 8a not capable of enabling the scan function and the mail transmission function is installed on the shared folder 22.

As a result of the determination by the determination part 33, the application program 8 to be installed is determined not to enable the function restricted with the common functional restriction information 24 in some cases. In such a case, the program is not rewritten by the rewrite part 34. So, the application program 8a installed on the shared folder 22 is equivalent to the application program 8 that the installation part 32 received to install.

The application program 8a installed on the shared folder 22 as explained above is displayed in a list form on the display unit 13 of the operational panel 12 so that each user is allowed to select and make execution. Specifically, a screen prompting the user to perform a log-in operation is displayed on the display unit 13 of the operational panel 12 by the application management part 30 while no one logs into the information processing device 1. As one of the users A, B and C logs into the information processing device 1 by performing the log-in operation, the application management part 30 creates a list of the application program, that the logged-in user is allowed to perform execution, of at least one application program installed in advance on the information processing device 1, and shows the created list on the display unit 13. The application management part 30 creates a list based on the application program 8a in the shared folder 22 and at least one application program in one of the user folders 23 corresponding to the logged-in user, and shows the created list on the display unit 13. After logging into the information processing device 1, each of the users A, B and C is allowed to select the desired application program of at least one application program installed in advance on the information processing device 1 and to give an instruction on execution of the selected application program.

In response to the instruction on execution of the application program by the logged-in user, the execution part 35 of the application management part 30 is put into operation to function. The execution part 35 reads and executes the application program selected by the logged-in user. When the application program 8a in the shared folder 22 is selected by the logged-in user, the execution part 35 stores the application program 8a in one of the user folders 23 corresponding to the logged-in user. As same as the installation, the execution part 35 puts the determination part 33 and the rewrite part 34 into operation to function.

The determination part 33 obtains the functional restriction information in one of the user folders 23 corresponding to the logged-in user in execution of the application program 8a in the shared folder 22. The determination part 33 analyzes the plurality of commands contained in the application program 8a to execute, thereby determining whether or not the command enabling the function available for the logged-in user is rewritten to disable. If the command contained in the application program 8a to execute is rewritten to disable the function available for the logged-in user, the determination part 33 puts the rewrite part 34 into operation to function.

The rewrite part 34 rewrites the command contained in the application program 8a to execute in execution of the application program 8a. More in specific, the rewrite part 34 rewrites, based on the functional restriction information corresponding to the logged-in user, the command contained in the application program 8a to execute and is rewritten with the common functional restriction information 24 back as the original command enabling the function available for the logged-in user. Thus, the command contained in the application program 8a in the shared folder 22 is rewritten to enable the function available for the logged-in user at the execution of the application program 8a based on the instruction given by the logged-in user.

The execution part 35 stores an application program 8b containing the command rewritten by the rewrite part 34 in one of the user folders 23 corresponding to the logged-in user, and reads and executes the application program 8b in the user folder 23.

Figure 6:
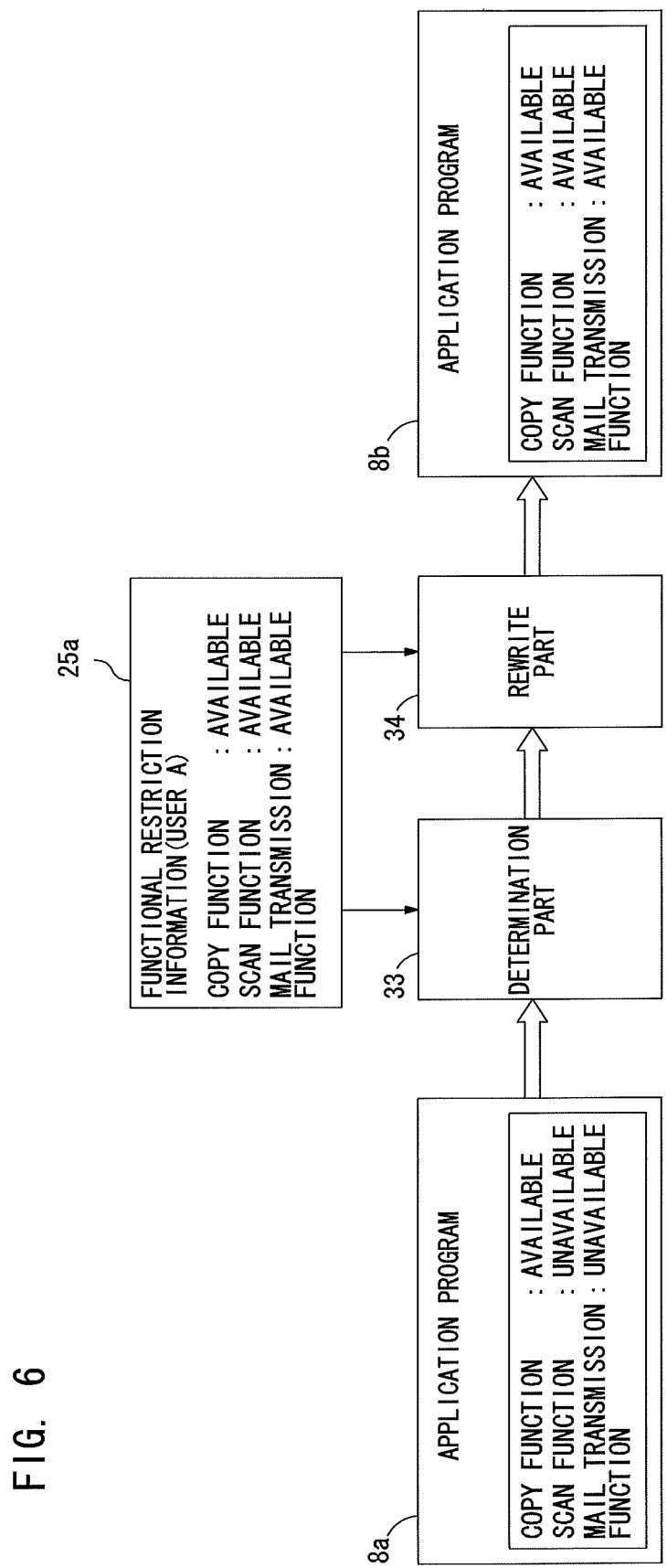
FIG. 6 shows exemplary operations of the determination part and the rewrite part in execution of the application program.

FIG. 6 shows exemplary operations of the determination part 33 and the rewrite part 34 in the execution of the application program 8a. In the example of FIG. 6, the application program 8a installed on the shared folder 22 is rewritten, hence, disables two functions, the copy function and the scan function of three functions, the copy function, the scan function and the mail transmission function. The exemplary operations shown in FIG. 6 are performed when the user A as the logged-in user makes an operation to give the instruction on execution of the application program 8a.

The determination part 33 analyzes the plurality of commands contained in the application program 8a in the execution of the application program 8a, thereby knowing the command contained in the application program 8a is rewritten to disable both of the scan function and the mail transmission function of three functions, the copy function, the scan function and the mail transmission function. The determination part 33 obtains the functional restriction information 25a in the user folder 23a of the user A, and determines whether or not the function disabled by the application program 8a due to the rewrite is unrestricted with the functional restriction information 25a. In the example of FIG. 6, the scan function and the mail transmission function are disabled by the application program 8a due to the rewrite, while the functions are available for the user A according to the functional restriction information 25a.

In such a case as referred to above, the rewrite part 34 is put into operation to function after the determination part 33, and rewrites the command contained in the program so that the application program 8a matches the functional restriction information 25a of the user A. To be more specific, the command rewritten not to allow the scan function to operate is rewritten back as the original command allowing the scan function to operate, and the command rewritten not to allow the mail transmission function to operate is rewritten back as the original command allowing the mail transmission function to operate. The application program 8b obtained in response to the rewrite as cited above is capable of enabling three functions, the copy function, the scan function and the mail transmission function as it corresponds to the functional restriction information 25a of the user A. The obtained application program 8b is stored in the user folder 23a of the user A.

When the determination part 33 determines that the function disabled by the application program 8a to execute and the function restricted with the functional restriction information of the logged-in user are the same, the rewrite part 34 does not rewrite the program. So, the application program 8b to store in one of the user folders 23 is equivalent to the application program 8a installed on the shared folder 22.

The execution part 35 reads and executes the application program 8b in one of the user folders 23 of the logged-in user, thereby capable of executing operations matching the functional restriction information configured in advance for the logged-in user. If the application program 8b to execute with the instruction of the logged-in user has already been stored in one of the user folders 23 of the logged-in user, the determination part 33 or the rewrite part 34 is not required to execute the above-described operations. Thus, the application program 8b as it is in one of the user folders 23 of the logged-in user may be read and executed.

Figure 7:
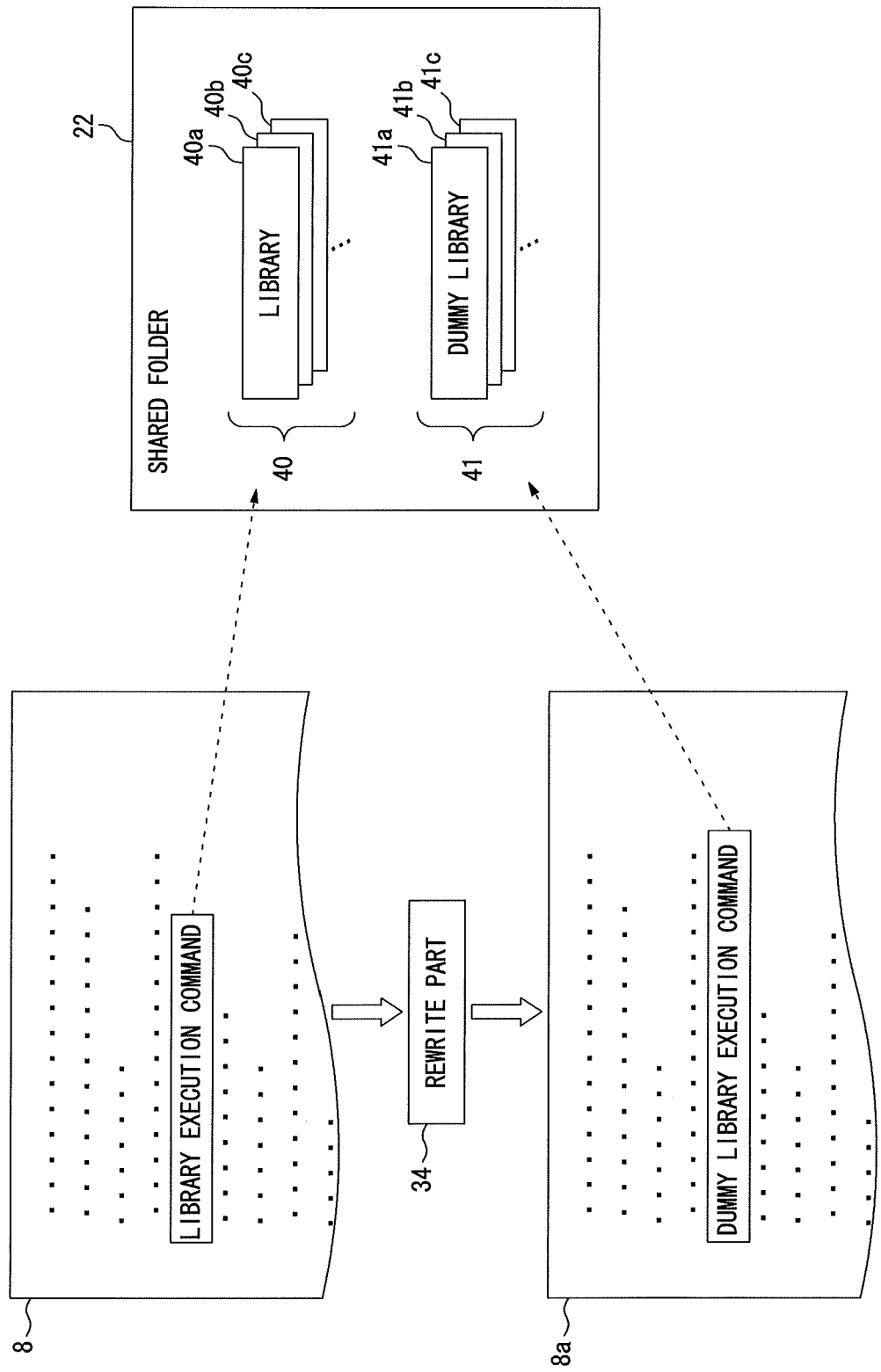
FIG. 7 shows an example of an operation of rewrite in installation of the application program.

An example of the rewrite of the application program by the determination part 33 and the rewrite part 34 is explained next. FIG. 7 shows an example of an operation of the rewrite in the installation of the application program 8. In the first preferred embodiment, the shared folder 22 stores therein in advance a plurality of libraries 40 in each of which the detailed process sequence of allowing each information processing function of the information processing device 1 to operate is defined. A library 40a allows the copy function to operate, for example. The library 40a defines a process sequence of working the scanner unit 15 and the printer unit 16 together and operating. A library 40b allows the scan function to operate, for example. The library 40b defines a process sequence of working the scanner unit 15 and the network interface 18 together and operating. A library 40c allows the mail transmission function to operate, for example. The library 40c defines a process sequence of transmitting an e-mail via the network interface 18.

The libraries 40a, 40b and 40c are one of the programs executed in the information processing device 1, and are the same as the application program, whereas each of the libraries 40a, 40b and 40c, is not executed alone. Each of the libraries 40a, 40b and 40c executes only a limited part of the process of allowing a specified function of the multiple information processing functions provided by the information processing device 1 to operate. The application program executed by the CPU 10 reads and executes the respective libraries 40a, 40b and 40c. The process realized by the respective libraries 40a, 40b and 40c is incorporated as the limited part of the comprehensive process, hence, the information processing device 1 may cause the information processing functions enabled by the application program to operate normally.

The libraries 40 of this kind are configured, for example, in advance for each of the multiple information processing functions provided by the information processing device 1 and stored in the shared folder 22. The libraries 40 are stored not only in the shared folder 22 but also in the user folder 23 of each user.

Referring to FIG. 7, in the first preferred embodiment, the shared folder 22 stores therein in advance dummy libraries 41 each of which corresponding to the respective libraries 40a, 40b and 40c. The dummy libraries 41 used not for actually allowing the variety of information processing functions of the information processing device 1 to operate is libraries in which an alternative process executed to replace the actual operation is defined. A dummy library 41a corresponds to the copy function. The alternative process that is executed to replace the process of actually operating the scanner unit 15 and the printer unit 16 is defined in the dummy library 41a. A dummy library 41b corresponds to the scan function. The alternative process that is executed to replace the process of actually operating the scanner unit 15 and the network interface 18 is defined in the dummy library 41b. A dummy library 41c corresponds to the mail transmission function. The alternative process that is executed to replace the process of actually transmitting the e-mail is defined in the dummy library 41c.

This kind of dummy libraries 41 are configured for each of the libraries 40 in the shared folder 22. The dummy libraries 41 are stored not only in the shared folder 22 but also in the user folder 23 of each user.

In creation of the application program 8 enabling the copy function, the scan function and the mail transmission function by a person such as the programmer, the program which reads and executes the above-cited libraries 40a, 40b and 40c is created. The application program 8 to install on the information processing device 1 contains the command to read and execute the libraries 40a, 40b and 40c. The commands, contained in the application program 8 created in a language such as a script language, are written in a text form. Some commands contained are to read and execute the libraries 40a, 40b and 40c.

The determination part 33, in the installation of the application program 8, analyzes the commands contained in the application program 8 line-by-line, and determines whether or not a library execution command to read and execute the libraries 40 allowing the function restricted with the common functional restriction information 24 to operate is contained. When the library execution command allowing the restricted function to operate is determined to be contained in the application program 8 to install, the rewrite part 34 rewrites the library execution command as a corresponding dummy library execution command. By way of example, when the application program 8 contains the library execution command allowing each of the scan function and the mail transmission function restricted with the common functional restriction information 24 to operate, the rewrite part 34 rewrites the contained library execution command as the dummy library execution command. So, the library execution command allowing the scan function to operate is rewritten as the dummy library execution command corresponding to the scan function, and the library execution command allowing the mail transmission function to operate is rewritten as the dummy library execution command corresponding to the mail transmission function.

The application program 8 is created to enable three functions, the copy function, the scan function and the mail transmission function. The application program 8 is rewritten, and the application program 8a enables only the copy function and disables two functions, the scan function and the mail transmission function is generated through the rewrite. The generated application program 8a is installed on the shared folder 22 as explained above.

It is assumed that the execution part 35 reads and executes the application program 8a as it is installed on the shared folder 22. In this case, only the function available for every user is enabled, and the other functions are not enabled. Therefore, only the function commonly available for all of the users A, B and C is enabled here. If the function is not available for the user, he or she is not able to use the function even in this state.

In this state, however, the user A, B or C may not be allowed to use the function even the one available for the user. In such a case, after the user A, B or C logs into the information processing device 1 and gives the instruction on execution of the application program 8a, the application program 8a is rewritten, hence, the application program 8b containing the command rewritten to enable the functions available for the logged-in user is generated. The application program 8b thereby obtained is stored in one of the user folders 23 of the logged-in user.

Figure 8:
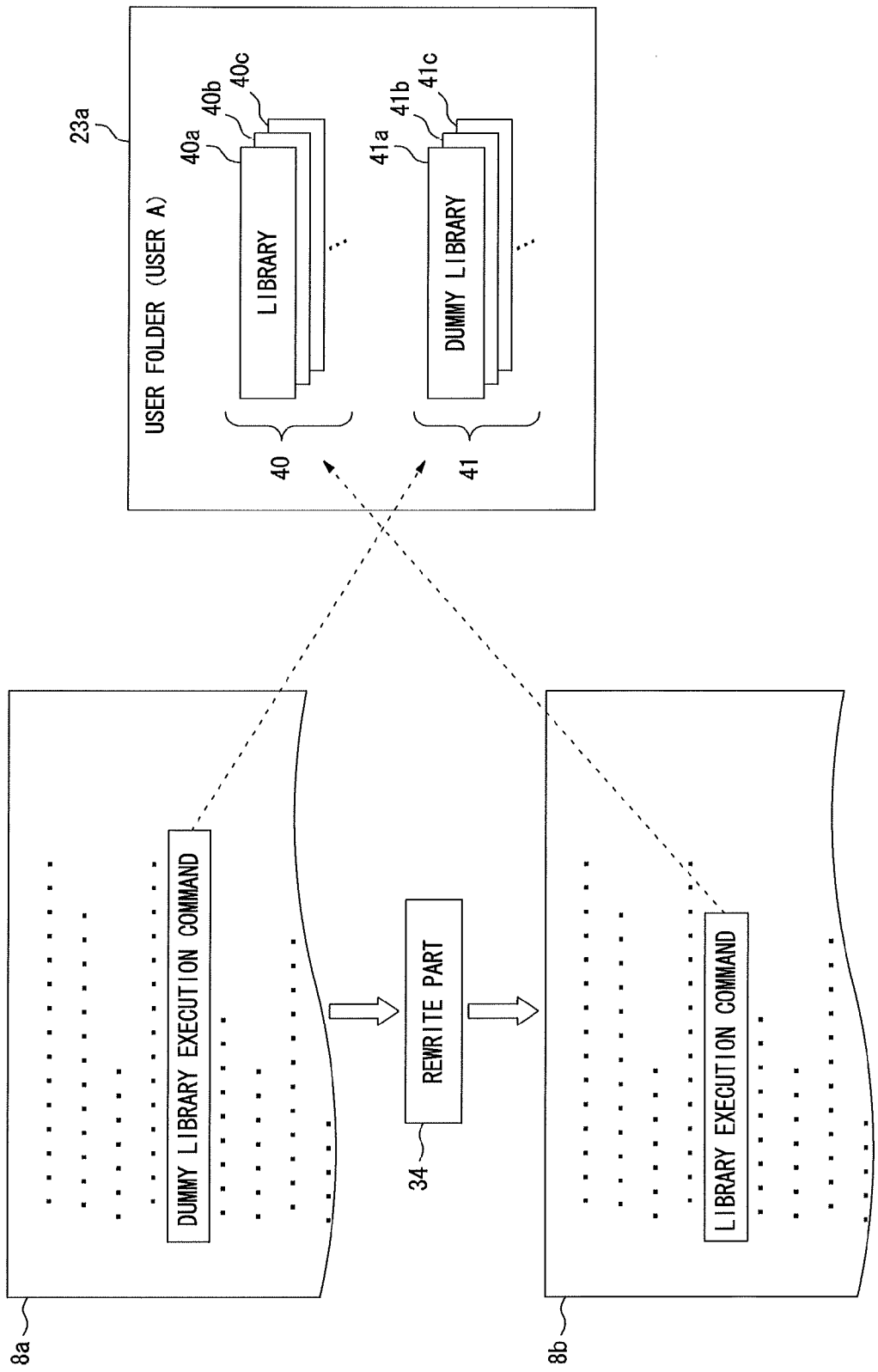
FIG. 8 shows an example of an operation of the rewrite in execution of the application program.
Figure 9:
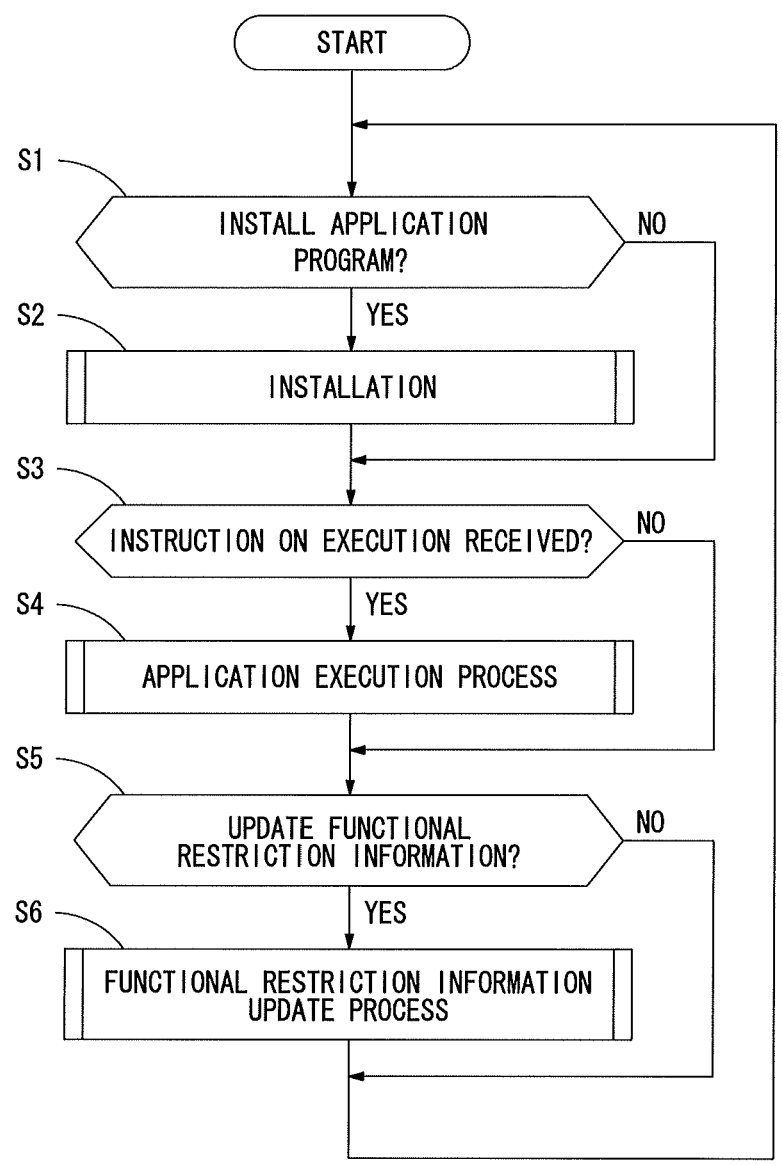
FIG. 9 is a flow diagram explaining the process sequence of the process executed in the information processing device in a first preferred embodiment.

FIG. 8 shows an example of an operation of the rewrite in the execution of the application program 8a. In response to the instruction on execution of the application program 8a by the user A, for example, the determination part 33 analyzes the commands contained in the application program 8a line-by-line, and determines whether or not the dummy library execution command is contained. When the dummy library execution command is determined to be contained, the rewrite part 34 rewrites the dummy library execution command as the corresponding library execution command based on the functional restriction information 25a of the user A as shown in FIG. 8.

Thus, the application program 8a rewritten to disable two functions, the scan function and the mail transmission function of three functions, the copy function, the scan function and the mail transmission function is again rewritten back to enable the two functions, the scan function and the mail transmission function. The application program 8b enables all of the three functions to match the functional restriction information 25a of the user A is generated through the rewrite. The generated application program 8b is stored in the user folder 23a of the user A.

As the execution part 35 reads and executes the application program 8b in the user folder 23a, the functions all available for the user A operate, whereas other functions, are not. The user A is allowed to normally use all of the functions configured to be available for the user A by the administrator.

Once the application program 8b is stored in the user folder 23a of the user A, the application program 8b is continued to be stored. When the instruction on execution of the application program 8b is again given by the user A thereafter, the execution part 35 may immediately execute the application program 8b without the rewrite process as cited above. The improved efficiency in the process of execution of the application program 8b is ensured.

The application program 8a in the shared folder 22 and/or the application program 8b in one of the user folders 23 are again rewritten if necessary in response to update of the common functional restriction information 24 in the shared folder 22 or the functional restriction information 25a, 25b or 25c stored in one of the user folders 23. If the administrator makes an operation to update any of the functional restriction information 25a, 25b or 25c, the functional restriction management part 31 updates the functional restriction information 25a, 25b or 25c in the user folder 23a, 23b or 23c. The functional restriction management part 31 then updates the common functional restriction information 24 in the shared folder 22 as required. After the functional restriction information 25a, 25b or 25c or the common functional restriction information 24 is updated by the functional restriction management part 31, the determination part 33 and the rewrite part 34 are put into operation to function. The determination part 33 determines whether or not the application program 8b stored in one of the user folders 23 matches the functional restriction information 25a, 25b or 25c updated by the administrator. The determination part 33 also determines whether or not the application program 8a in shared folder 22 matches the common functional restriction information 24. The rewrite part 34, based on the determination, rewrites the command contained in the application program 8b in one of the user folders 23 or the command contained in the application program 8a in the shared folder 22. Thus, the application programs 8a and 8b in the shared folder 22 and one of the user folders 23 are managed to match the functional restriction information 25a, 25b or 25c configured individually for each of the users A, B and C.

The detail of the process sequence executed in the information processing device 1 is described next. FIGS. 9 to 12 are flow diagrams explaining the process sequences of the processes executed in the information processing device 1 in the first preferred embodiment. The processes are executed in response to start of the application management program 21 by the CPU 10. That is, the process sequences are executed when the CPU 10 functions as the above-described application management part 30.

After starting the application management program 21, the CPU 10 determines whether or not to install the application program 8 (step S1). The CPU 10 determines whether or not the instruction on installation of the application program 8 is received through the network 4 from the computer 2 or the server 3, for example. When the instruction on installation is received (when a result of step S1 is YES), the CPU 10 proceeds with the installation of the application program 8 (step S2). After the installation, the CPU 10 moves on to step S3. When the instruction on installation is not received (when a result of step S1 is NO), the CPU 10 skips step S2 and moves on to step S3.

The CPU 10 then determines whether or not the instruction on execution of one the application programs installed on the information processing device 1 is received (step S3). It is determined that whether or the logged-in user logging into the information processing device 1 has selected and given the instruction on execution of the application program installed on the information processing device 1, for instance. In response to the instruction on execution of the application program (when a result of step S3 is YES), an application execution process is executed (step S4). After the application execution process, the CPU 10 moves on to step S5. In response to no instruction on execution of the application program (when a result of step S3 is NO), the CPU 10 skips step S4 and moves on to step S5.

The CPU 10 determines if it is necessary to update the functional restriction information 25a, 25b or 25c (step S5). To be more specific, whether or not the instruction on update of the functional restriction information 25a, 25b or 25c is given by the administrator is determined, for example. When the functional restriction information 25a, 25b or 25c is required to be updated (when the result of step S5 is YES), a functional restriction information update process is executed (step S6). The CPU 10 executes the functional restriction information update process, and returns to step S1. When the functional restriction information 25a, 25b or 25c is not required to be updated (when the result of step S5 is NO), the CPU 10 skips step S6 and returns to step S1.

The CPU 10 thereafter repeats the above-cited process. So, after the information processing device 1 is turned on, the CPU 10 starts the application management program 21, and executes the above-cited process repeatedly. As receiving the instruction on installation of the new application program 8 while the information processing device 1 is turned on, the CPU 10 executes the installation (step S2) in response to the instruction. As receiving the instruction on execution of the application program by the logged-in user, the CPU 10 executes the application execution process (step S4) in response to the instruction. Moreover, in response to the update of the functional restriction information 25a, 25b or 25c by the administrator, the CPU 10 executes the functional restriction information update process (step S6), thereby reflecting the update by the administrator in real time. The processes are explained in detail next.

Figure 10:
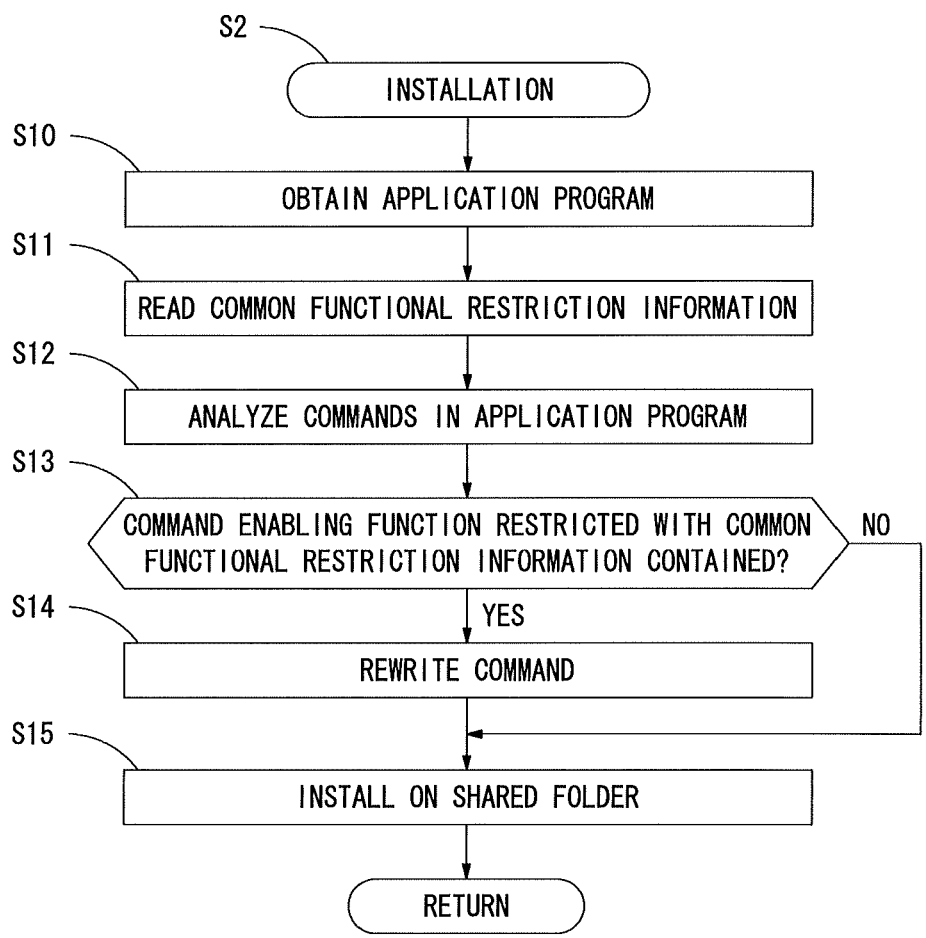
FIG. 10 is a flow diagram explaining in detail the process sequence of an installation.

FIG. 10 is a flow diagram explaining in detail the process sequence of the installation (step S2). The installation puts the CPU 10 into operation to function as the installation part 32, the determination part 33 and the rewrite part 34 as described above. By starting the installation, the CPU 10 obtains the application program 8 to install (step S10). By way of example, the application program 8 received from the computer 2 or the server 3 via the network interface 18 is obtained as the program to install. The CPU 10 reads the common functional restriction information 24 in the shared folder 22 (step S11), and thereafter analyzes the commands contained in the application program 8 to install (step S12). The CPU 10 analyzes whether or not the command which enables the function restricted with the common function restriction information 24 is contained in the application program 8 to install. All commands enabling the function restricted with the common function restriction information 24 are extracted if such command is contained.

The CPU 10 determines, based on the result of above-described analysis, whether or not the application program 8 to install contains the command enabling the function restricted with the common function restriction information 24 (step S13). As the command enabling the function restricted with the common function restriction information 24 is contained (when a result of step S13 is YES), all of such commands are rewritten (step S14). The CPU 10 rewrites the command enabling the restricted function contained in the application program 8 (for example, the library execution command) as the command disabling the function (for example, the dummy library execution command). In response to the rewrite, the application program 8 obtained to install is rewritten as the application program 8a not enabling the function restricted with the common function restriction information 24. The application program 8a containing the rewritten command is to be installed. As the command enabling the function restricted with the common function restriction information 24 is not contained in the application program 8 to install (when a result of step S13 is NO), the application program 8 is to be installed as it is as the application program 8*a*.

The CPU 10 installs the application program 8*a*, obtained with the above-described process as the program to install, on the shared folder 22 (step S15). The application program 8*a* is installed on the shared folder 22 as the program capable of enabling only the function that is commonly available for every user A, B and C. The installation is completed as explained above.

Figure 11:
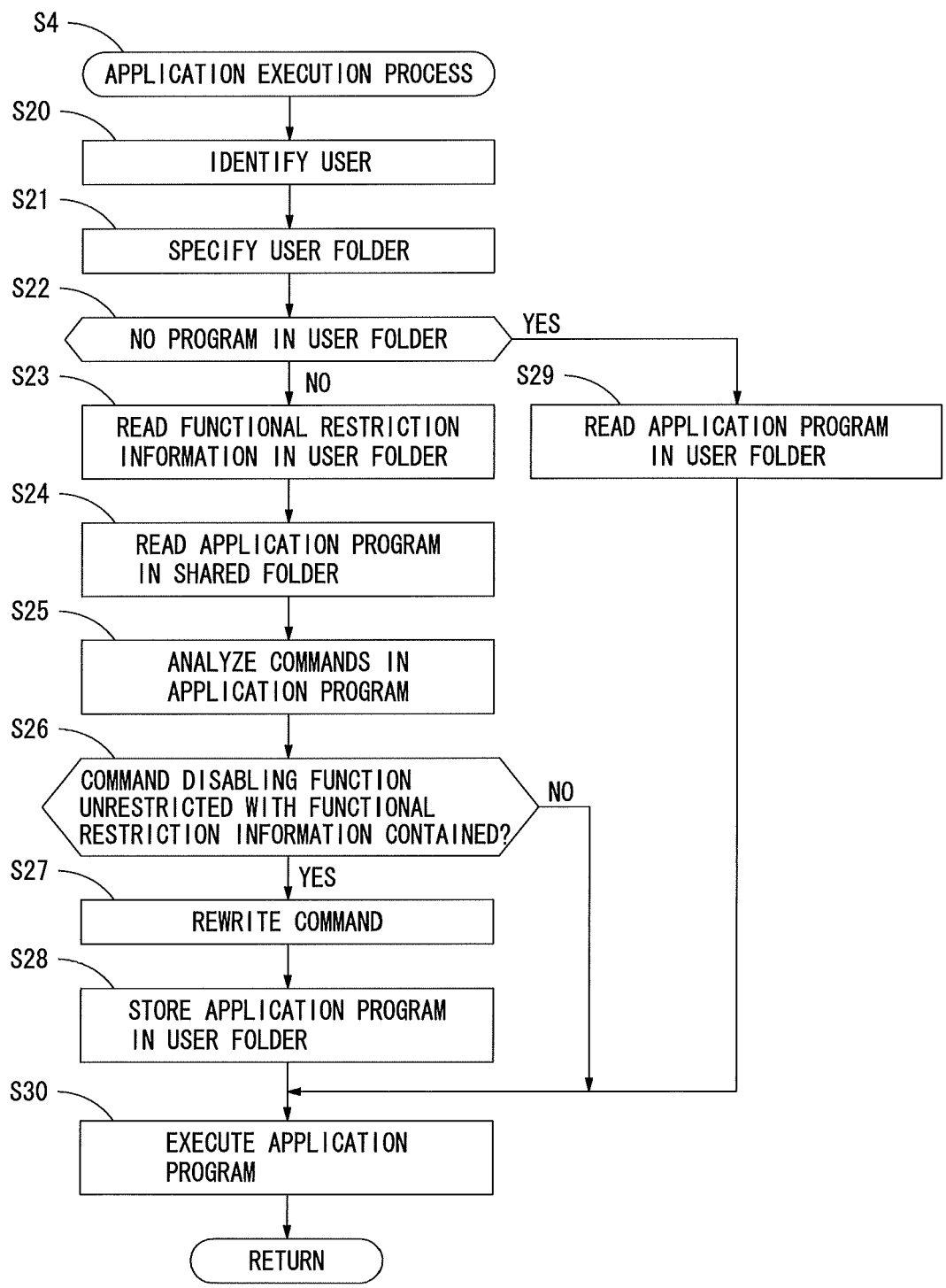
FIG. 11 is a flow diagram explaining in detail the process sequence of an application execution process.

FIG. 11 is a flow diagram explaining in detail the process sequence of the application execution process (step S4). The application execution process puts the CPU 10 into operation to function as the execution part 35, the determination part 33 and the rewrite part 34. By starting the application execution process, the CPU 10 identifies the user (step S20). By way of example, the logged-in user logging into the information processing device 1 is identified. The CPU 10 specifies one of the user folders 23 corresponding to the identified user (step S21). When, for example, the logged-in user is the user A, the CPU 10 specifies the user folder 23*a* corresponding to the user A.

The CPU 10 checks whether or not the application program 8*b* to execute is stored in the specified one of user folders 23 (step S22). If the application program 8*b* to execute is not stored in the specified one of user folders 23 (when a result of step S22 is NO), the CPU 10 reads the functional restriction information 25*a*, 25*b* or 25*c* of the logged-in user in the specified one of user folders 23 (step S23). By way of example, the functional restriction information 25*a* configured in advance for the user A, the logged-in user, in the user folder 23*a* of the user A is read.

The CPU 10 reads the application program 8*a* to execute in the shared folder 22 (step S24), and thereafter analyzes the commands contained in the read application program 8*a* (step S25). The CPU 10 analyzes whether or not the command enabling the function unrestricted with the functional restriction information 25*a*, 25*b* or 25*c* of the logged-in user is rewritten to disable and is contained in the application program 8*a* to execute. All commands that enable the function unrestricted with the functional restriction information 25*a*, 25*b* or 25*c* and are rewritten as the respective dummy library execution commands, for example, are extracted if such command is contained.

The CPU 10, based on the result of above-described analysis, determines whether or not any command, of the commands contained in the application program 8*a*, is rewritten to disable the function unrestricted with the functional restriction information 25*a*, 25*b* or 25*c* of the logged-in user (step S26). As at least one command rewritten to disable is contained (when a result of step S26 is YES), all of such commands are rewritten (step S27). The CPU 10 rewrites the command rewritten to disable the function (for example, the dummy library execution command) in the application program 8*a* as the command effectively enabling the function (for example, the library execution command) based on the functional restriction information 25*a*, 25*b* or 25*c* of the logged-in user. In response to the rewrite, the application program 8*a* read to execute from the shared folder 22 is rewritten as the application program 8*b* appropriately enabling the function that the logged-in user is allowed to use based on the functional restriction information 25*a*, 25*b* or 25*c* of the logged-in user. The application program 8*b* containing the rewritten command is to be executed. The CPU 10 stores the application program 8*b* in one of the user folders 23 of the logged-in user prior to execution of the application program 8*b* (step S28).

As the application program 8*a* in the shared folder 22 read does not contain the command rewritten to disable the function even though the function is unrestricted for the logged-in user (when a result of step S26 is NO), the application program 8*a* is to be executed as it is.

If the application program 8*b* to execute has already been stored in one of the user folders 23 of the logged-in user in step S22 (when a result of step S22 is YES), the CPU reads the application program 8*b* in one of the user folders 23 to execute (step S29).

The CPU 10 starts execution of the application program 8*b* (or 8*a*) obtained through the above-described process to execute (step S30). The execution causes the function unrestricted with the functional restriction information 25*a*, 25*b* or 25*c* configured for each user to be available for the logged-in user. As, for example, the logged-in user is the user A, the CPU 10 executes the application program 8*b*. The execution causes the information processing device 1 to operate, hence, makes all of the functions, the copy function, the scan function and the mail transmission function enabled by the application program 8*b* to be effectively available. As, for example, the logged-in user is the user B, the CPU 10 executes the application program 8*b*. The execution causes the information processing device 1 to operate, hence, makes two functions, the copy function and the mail transmission function enabled by the application program 8*b* to be effectively available but not the scan function. As, for example, the logged-in user is the user C, the CPU 10 executes the application program 8*b*. The execution causes the information processing device 1 to operate, hence, makes two functions, the copy function and the scan function enabled by the application program 8*b* to be effectively available but not the mail transmission function. The application execution process allows the information processing device 1 to enable each of the information processing functions with appropriately reflecting the respective functional restriction information of the users configured in advance by the administrator.

Figure 12:
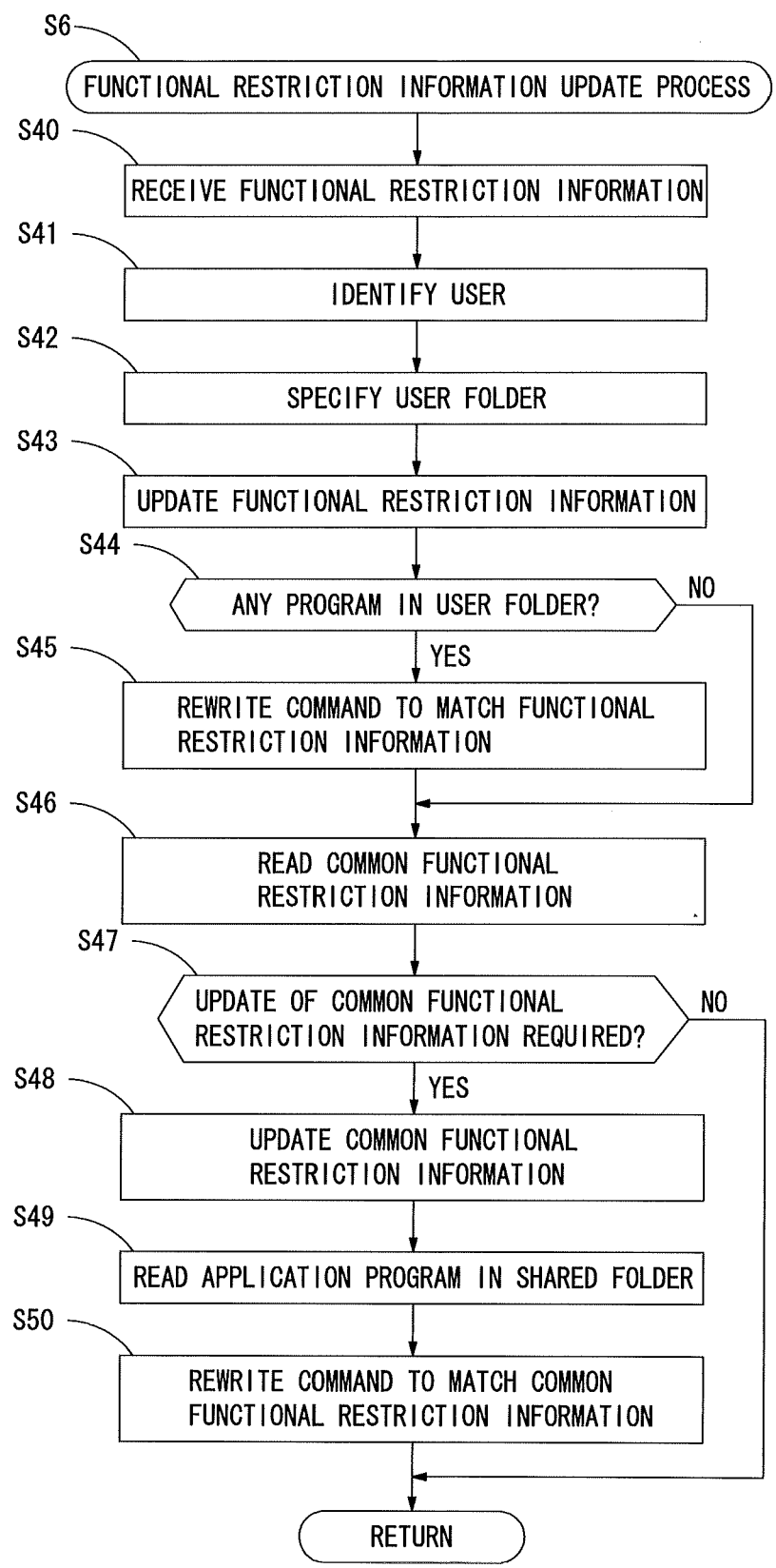
FIG. 12 is a flow diagram explaining in detail the process sequence of a functional restriction information update process.

FIG. 12 is a flow diagram explaining in detail the process sequence of the functional restriction information update process (step S6). The functional restriction information update process puts the CPU 10 into operation to function as the function restriction management part 31, the determination part 33 and the rewrite part 34. By starting the functional restriction information update process, the CPU 10 receives the functional restriction information 25*a*, 25*b* or 25*c* input by the administrator (step S40). The functional restriction information 25*a*, 25*b* or 25*c* contains information to identify the user, for instance. The receipt of the functional restriction information 25*a*, 25*b* or 25*c* by the CPU 10 causes to identify whose functional restriction information 25*a*, 25*b* or 25*c* is to be updated (step S41). The CPU 10 also specifies one of the user folders 23 corresponding to the identified user (step S42). The CPU 10 stores the functional restriction information 25*a*, 25*b* or 25*c* in the specified one of user folders 23, thereby updating the functional restriction information 25*a*, 25*b* or 25*c* (step 43).

The CPU 10 checks whether or not the application program 8*b* is stored in the specified one of user folders 23 (step S44). If the application program 8*b* is stored in the specified one of user folders 23 (when a result of step S44 is YES), the CPU 10, based on the updated functional restriction information 25*a*, 25*b* or 25*c*, rewrites the command contained in the application program 8*b* (step S45). The update of the functional restriction information 25*a*, 25*b* or 25*c* sometimes increases the number of the function available for the identified user, for example. In such a case, the command corresponding to the additive unrestricted function contained in the application program 8*b* is rewritten as the library execution command from the dummy library execution command. The update of the functional restriction information 25*a*, 25*b* or 25*c* sometimes reduces the number of the function available for the identified user, for example. In such a case, the command corresponding to the additive restricted function contained in the application program 8*b* is rewritten as the dummy library execution command from the library execution command. If the application program 8*b* is not stored in the specified one of user folders 23 (when a result of step S44 is NO), the CPU 10 does not execute the process in step S45.

The CPU 10 reads the common functional restriction information 24 in the shared folder 22 (step S46). The CPU thereafter determines whether or not the update of the functional restriction information 25*a*, 25*b* or 25*c* requires update of the common functional restriction information 24 (step S47). As the common functional restriction information 24 does not need to be updated (when a result of step S47 is NO), the functional restriction information update process is completed.

As the common functional restriction information 24 needs to be updated (when a result of step S47 is YES), the CPU 10 updates the common functional restriction information 24 (step S48). The CPU 10 reads the application program 8*a* in the shared folder 22 (step S49), and rewrites the command contained in the application program 8*a* to match the updated common functional restriction information 24 based on the updated common functional restriction information 24 (step S50). The command is rewritten in order for the application program 8*a* to ensure consistency with the updated common functional restriction information 24. As the update of the common functional restriction information 24 increases the number of the function commonly available for each user, for example, the command corresponding to the additive available function contained in the application program 8*a* is rewritten as the library execution command from the dummy library execution command. As the update of the common functional restriction information 24 reduces the number of the function commonly available for each user, for example, the command corresponding to the additive unavailable function contained in the application program 8*a* is rewritten as the dummy library execution command from the library execution command. The functional restriction information update process is then completed.

The functional restriction information 25*a*, 25*b* or 25*c* of any one of the plurality of users A, B and C is updated through the functional restriction information update process as referred to above. In response to the update, the application program 8*a* and/or 8*b* in the shared folder 22 or one of the user folders 23 is rewritten as required. Even after the installation of the application program 8 on the information processing device 1, the application program 8*a* and/or 8*b* in the information processing device 1 is rewritten in real time to match the updated functional restriction information 25*a*, 25*b* or 25*c* as the functional restriction information 25*a*, 25*b* or 25*c* is updated by the administrator. Each of the information processing functions operates with reflecting the functional restriction information 25*a*, 25*b* and 25*c* appropriately updated to the newest information at any time when each of the users A, B and C uses the information processing device 1.

As described above, the information processing device 1 of the first preferred embodiment analyzes the commands contained in the application program 8 in installation of the application program 8 created by the person such as the programmer, thereby determining whether or not the command enabling the function restricted with the common functional restriction information 24 is contained. When the application program 8 contains the command enabling the function restricted with the common functional restriction information 24, the command contained in the application program 8 is rewritten. The application program 8 containing the command rewritten to disable the function restricted with the common functional restriction information 24 is installed. The application program 8 is installed on the information processing device 1 as the application program 8*a* that only enables the function commonly available for all the plurality of users A, B and C of the information processing functions provided by the information processing device 1.

The manner of the installation of this kind allows the user of the information processing device 1 or the programmer other than the users to create the application program 8 without considering what information is contained in the functional restriction information 25*a*, 25*b* and 25*c* configured for each user in creation of the application program 8 to install on the information processing device 1. The person such as the programmer is extremely less operative burdened when creating the application program 8. Therefore, the efficient creation of the program is ensured, and the user friendliness of the information processing device 1 improves. The administrator is also less operative burdened as the application program 8 created by the programmer does not require test operation.

The information processing device 1 of the first preferred embodiment reads the functional restriction information 25*a*, 25*b* or 25*c* of the specified user in execution of the installed application program 8*a* based on the instruction by the specified user. The information processing device 1 then analyzes the commands contained in the application program 8*a*, thereby determining whether or not the command is rewritten to disable the function available for the specified user. When the command is rewritten to disable the function available for the specified user, the command contained in the application program 8*a* is rewritten again to enable the function available for the specified user, and the application program 8*a* is executed. So, the application program 8*a* executed in the information processing device 1 is executed as the application program 8*b* containing the command rewritten to normally enable every function available for the specified user.

The manner of the application execution of this kind allows the user of the information processing device 1 or the programmer other than the users to create the application program 8 without considering what information is contained in the functional restriction information 25*a*, 25*b* and 25*c* configured for each user in creation of the application program 8 to execute in the information processing device 1. The person such as the programmer is extremely less operative burdened when creating the application program 8. Therefore, the efficient creation of the program is ensured, and the user friendliness of the information processing device 1 improves. The administrator is also less operative burdened as the application program 8 created by the programmer does not require test operation.

The information processing device 1 installs the application program 8*a* containing the command rewritten to disable the function restricted with the common functional restriction information 24 on the shared folder 22 in the installation of the application program 8. The shared folder 22 is the shared storage region commonly available for the plurality of users. So, the application program 8*a* installed on the shared folder 22 is available for each of the plurality of users. Once the application program 8*a* is installed on the information processing device 1, the application program 8*a* thereby installed on the shared folder 22 is available for every user without restriction. The application program 8*a* installed on the shared folder 22, however, is restricted to enable the information processing functions provided by the information processing device 1 except for the function commonly available for all of the plurality of users. The range of the function enabled by execution of the application program 8a in the information processing device 1 is equivalent to or smaller than the range of the functions configured with the functional restriction information 25a, 25b and 25c of each user.

Therefore, the information processing device 1, in execution of the application program 8a based on the instruction of the specified user, creates the application program 8b containing the command rewritten to enable the function available for the specified user and stores the created application program 8b in one of the user folders 23 of the specified user and executes. The one of user folders 23 is the storage region exclusive to the specified user and, hence, is designed to allow access only by the specified user. Thus, other users are not allowed to access the application program 8b in one of the user folders 23 of the specified user. The application program 8b in one of the user folders 23 is exclusively used only by the specified user, and effectively enables the information processing functions corresponding to the specified user.

As refer to above, the programmer is less operative burdened when creating the program to install on the information processing device, thereby being capable of creating the program efficiently. In addition, the administrator is less operative burdened.

Second Preferred Embodiment

The second preferred embodiment is described next. In the first preferred embodiment as explained above, the command contained in the application program 8 and/or 8a is rewritten when the application program 8 created by the person such as the programmer is installed on the information processing device 1 or the application program 8a already installed on the information processing device 1 is executed based on the first instruction on execution of each user. The installation of the application program 8 or the first execution of the application program 8a impairs process efficiency. In the second preferred embodiment, an example of configurations capable of executing the installation and the execution process of the application program 8 is described. The main configuration of the information processing device 1 of the second preferred embodiment is the same as that of the first preferred embodiment.

Figure 13:
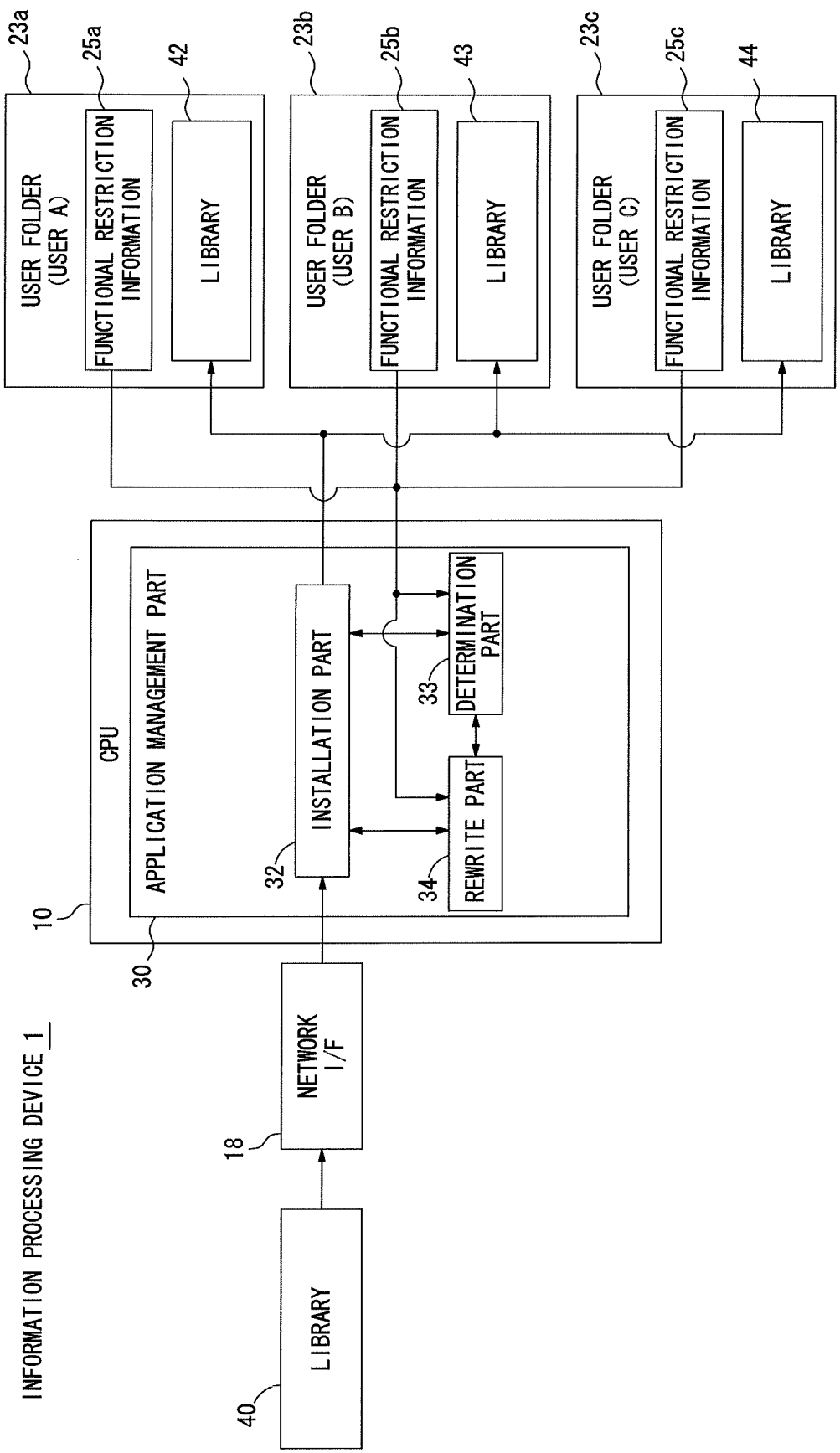
FIG. 13 is a block diagram showing the functional configuration realized when the CPU of the information processing device installs libraries in a second preferred embodiment.

The information processing device 1 of the second preferred embodiment rewrites the libraries 40 in installation of the libraries 40 on each of the user folders 23 of the users A, B and C. FIG. 13 is a block diagram showing the functional configuration realized when the CPU 10 of the information processing device 1 installs the libraries 40 in the second preferred embodiment. Each block shown in FIG. 13 is realized by execution of the application management program 21 by the CPU 10 also in the second preferred embodiment. Only the user folders 23a, 23b and 23c corresponding to the users A, B and C are shown, and the shared folder 22 commonly used by the users A, B and C is not shown in FIG. 13.

By referring to FIG. 13, the CPU 10 executes the application management program 21, thereby functioning as an application management part 30. The application management part 30 further functions as the installation part 32, the determination part 33 and the rewrite part 34 in installation of the libraries 40 on the respective user folders 23a, 23b and 23c of the users A, B and C. Each part is explained in detail below.

The installation part 32 installs the new libraries 40 received via the network interface 18 by the information processing device 1 on the respective user folders 23a, 23b and 23c of the users A, B and C. The libraries 40 to install is one kind of programs in which a detailed process sequence of enabling each of the information processing functions of the information processing device 1 is defined, whereas, are not executed alone. With execution of the application program installed on the information processing device 1, the libraries 40 are read and executed. The libraries 40 contain a range of commands to execute the detailed process sequence of allowing each of the information processing functions of the information processing device 1 to operate. After obtaining the libraries 40 as referred to above, the installation part 32 puts the determination part 33 into operation to function first.

The determination part 33 reads the functional restriction information 25a, 25b and 25c in the respective user folders 23a, 23b and 23c of the users A, B and C when installing the libraries 40. The determination part 33 analyzes the plurality of commands contained in the libraries 40, thereby determining whether or not the library allowing the function restricted with the functional restriction information 25a, 25b and 25c configured for each user A, B and C to operate is included. The determination part 33 executes this determination for each of the functional restriction information 25a, 25b and 25c configured for each user A, B and C separately. When the libraries 40 to install include the library enables the function restricted with the functional restriction information 25a, 25b and 25c of each user A, B and C, the determination part 33 puts the rewrite part 34 into operation to function.

The rewrite part 34 rewrites the predetermined command contained in the libraries 40. The rewrite part 34 rewrites the predetermined command contained in the libraries 40. More specifically, the rewrite part 34 rewrites the command to execute the process sequence defined to allow the function restricted with the respective functional restriction information 25a, 25b and 25c to operate to disable the function. The command is rewritten separately to match each of the functional restriction information 25a, 25b and 25c corresponding to the users A, B and C. Thus, the libraries 42 matching the functional restriction information 25a of the user A, the libraries 43 matching the functional restriction information 25b of the user B and the libraries 44 matching the functional restriction information 25c of the user C are created separately.

The installation part 32 installs the libraries 42, 43 and 44 containing the commands respectively rewritten by the rewrite part 34 on each of the user folders 23a, 23b and 23c corresponding to the users A, B and C. More specifically, the libraries 42 corresponding to the functional restriction information 25a of the user A are installed on his or her user folder 23a, the libraries 43 corresponding to the functional restriction information 25b of the user B are installed on his or her user folder 23b and the libraries 44 corresponding to the functional restriction information 25c of the user C are installed on his or her user folder 23c.

Figure 14:
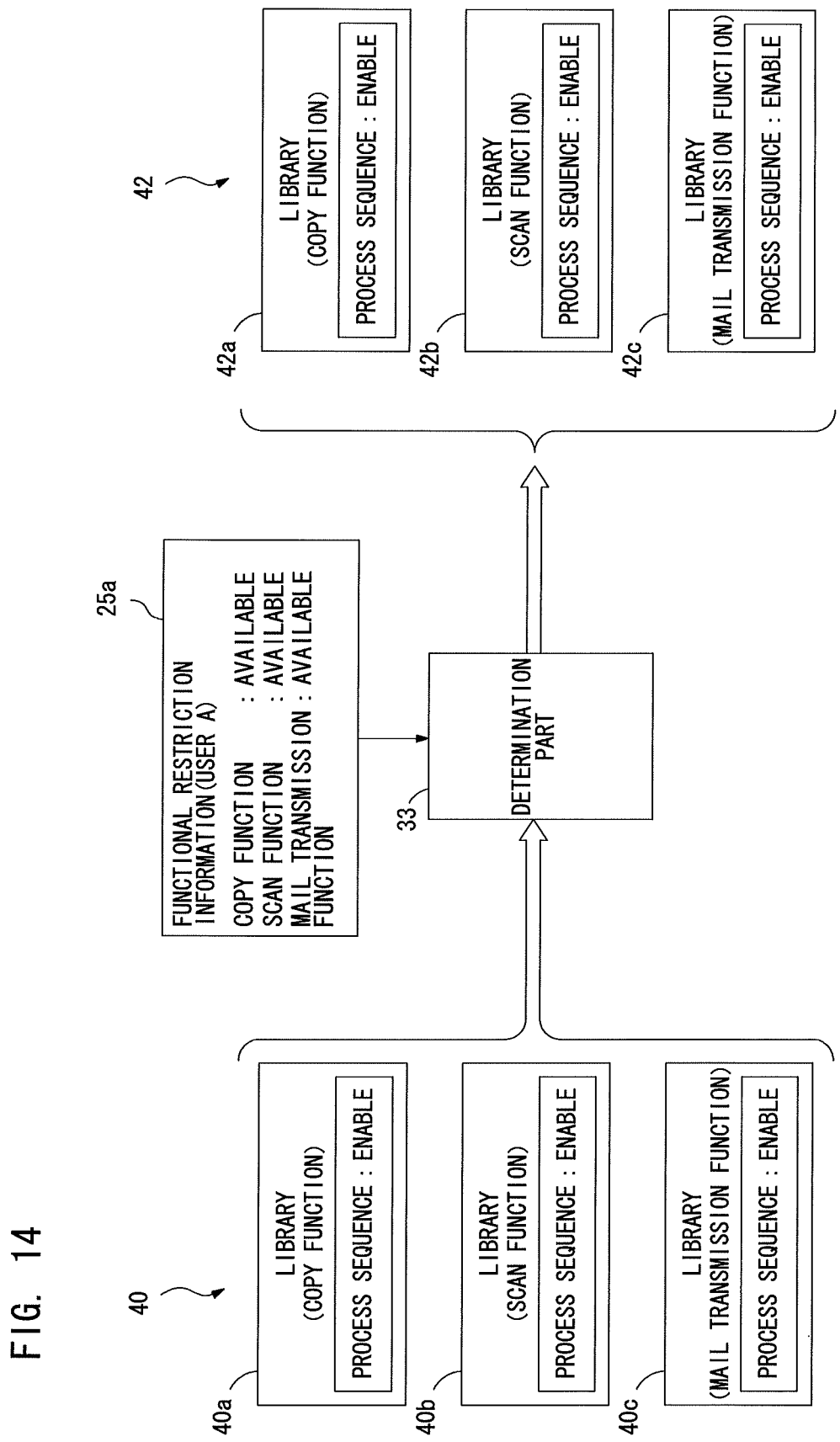
FIG. 14 shows the concept of libraries installed on a user folder of user A.

The libraries 42, 43 and 44 installed on the respective user folders 23a, 23b and 23c are described in detail next. FIG. 14 shows the concept of the libraries 42 installed on the user folder 23a of the user A. The libraries 40 to be installed shown in FIG. 14 include the plurality of libraries 40a, 40b and 40c allow the variety of information processing functions of the information processing device 1 to operate. The configurations of the libraries 40a, 40b and 40c of the second preferred embodiment are the same as those of the first preferred embodiment. The library 40a, for example, allows the copy function to operate, the library 40b allows the scan function to operate and the library 40c allows the mail transmission function to operate.

The process sequence of allowing the respective information processing functions to operate is defined in each of the libraries 40a, 40b and 40c. The process sequence of this kind is defined by the command with which the process sequence is executed. As the CPU 10 reads and executes the libraries 40a, 40b and 40c that are containing the commands capable of enabling, the respective information processing functions corresponding to the libraries 40a, 40b and 40c operate in the information processing device 1. The respective information processing functions corresponding to the libraries 40a, 40b and 40c in the information processing device 1 does not operate if the CPU 10 reads and executes the libraries 40a, 40b and 40c that are containing the commands rewritten to disable.

As shown in FIG. 14, the determination part 33, in installation of the libraries 40 on the user folder 23a of the user A, reads his or her functional restriction information 25a. The determination part 33 determines whether or not each of the libraries 40a, 40b and 40c included in the libraries 40 contains the command allowing the function restricted with the functional restriction information 25a to operate. By referring to FIG. 14, the functional restriction information 25a of the user A includes information in which three functions, the copy function, the scan function and the mail transmission function, are available for the user A is defined. Each of the libraries 40a, 40b and 40c included in the libraries 40 does not contain the command allowing the function restricted with the functional restriction information 25a to operate. So, the libraries 42 installed on the user folder 23a of the user A are equivalent to the libraries 40 that the installation part 32 received to install. More in detail, each of the libraries 42a, 42b and 42c included in the libraries 42 to be installed on the user folder 23a is exactly the same as each of the libraries 40a, 40b and 40c included in the libraries 40. The commands contained in each of the libraries 42a, 42b and 42c still enables the respective functions, and the libraries 42a, 42b and 42c are installed. As the CPU 10 reads and executes the libraries 42a, 42b and 42c that are containing the commands capable of enabling, the information processing function corresponding to each of the libraries 42a, 42b and 42c operates normally.

Figure 15:
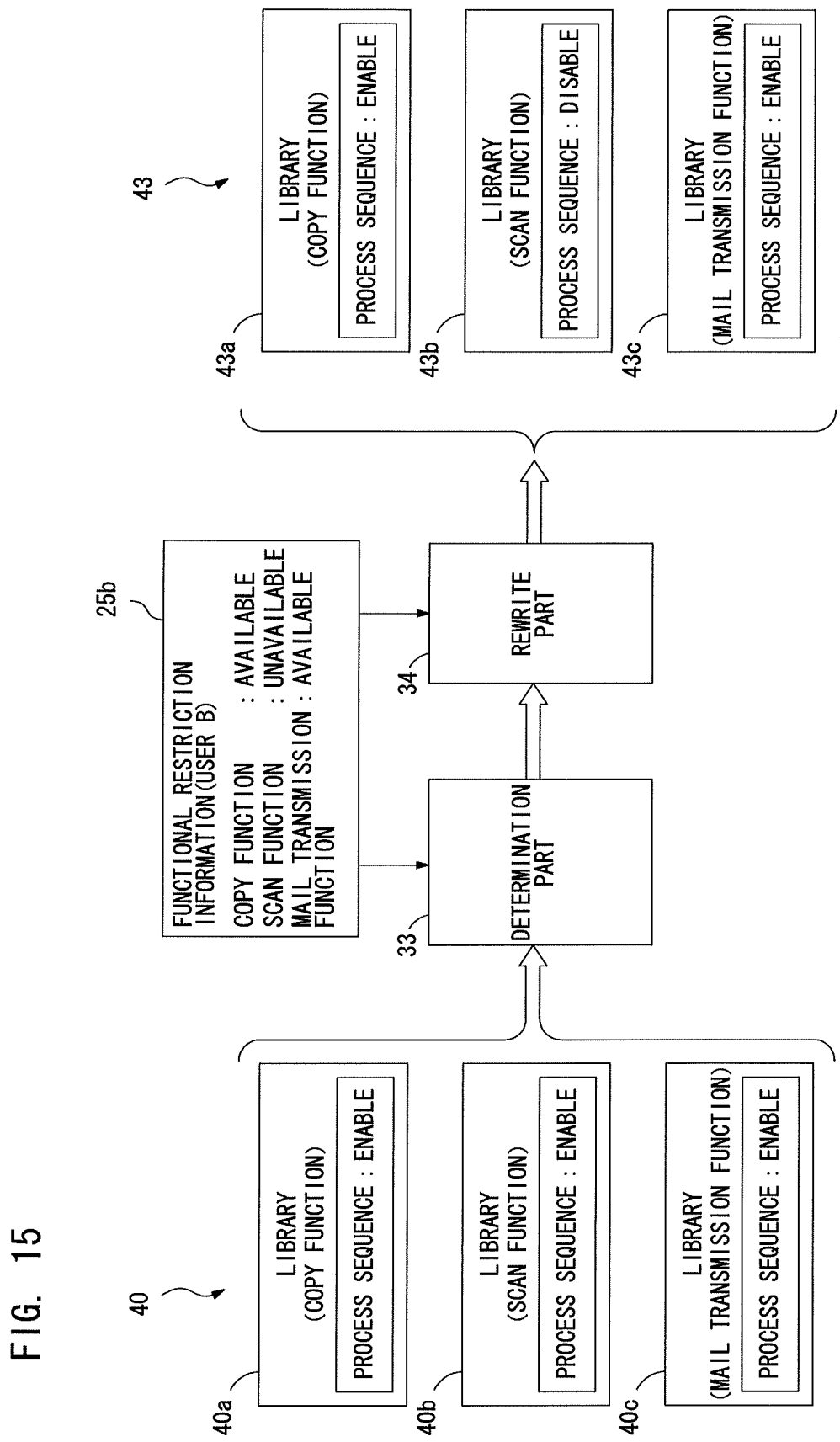
FIG. 15 shows the concept of libraries installed on a user folder of user B.

FIG. 15 shows the concept of the libraries 43 installed on the user folder 23b of the user B. The determination part 33, in installation of the libraries 40 on the user folder 23b of the user B, reads his or her functional restriction information 25b. The determination part 33 determines whether or not each of the libraries 40a, 40b and 40c included in the libraries 40 contains the command allowing the function restricted with the functional restriction information 25b to operate. By referring to FIG. 15, the functional restriction information 25b of the user B shows that the use of the scan function is restricted. The library 40b corresponding to the scan function contains the command allowing the function restricted with the functional restriction information 25b to operate.

In such a case, the rewrite part 34 is put into operation to function to rewrite the command contained in the library 40b. The command defined to execute the process sequence in the library 40b is rewritten to disable. By way of example, by replacing the command capable of executing the process sequence in the library 40b with a simple comment, the rewrite part 34 rewrites the command not capable of executing the process sequence. Information showing the process sequence is executed normally as a result of the process may be added newly as the command to send a response to the application program. As a result, the process sequence of allowing the scan function to operate is not executed even when the library 40b is executed by the CPU 10. In the example of FIG. 15, the libraries 40a and 40c contain the commands allowing the function available for the user B to operate, hence, are not rewritten.

The libraries 43 including the library 43b is installed on the user folder 23b of the user B. The included library 43b corresponding to the scan function is rewritten to disable the defined process sequence. So, the libraries 43a and 43c installed on the user folder 23b each is equivalent to each of the libraries 40a and 40b included in the libraries 40 that the installation part 32 received to install, whereas the library 43b, is not equivalent to the library 40b. In this case, the commands contained in each of the libraries 43a and 43c still enables the respective functions, and the libraries 43a and 43c are installed. As the CPU 10 reads and executes the libraries 43a and 43c, the respective information processing functions corresponding to the libraries 43a and 43c (that are, the copy function and the mail transmission function) operate normally. The command contained in the library 43b is rewritten to disable the corresponding function, and the library 43b is installed. The information processing function corresponding to the library 43b (that is, the scan function) does not operate in the information processing device 1 even when the CPU 10 reads and executes the library 43b.

Figure 16:
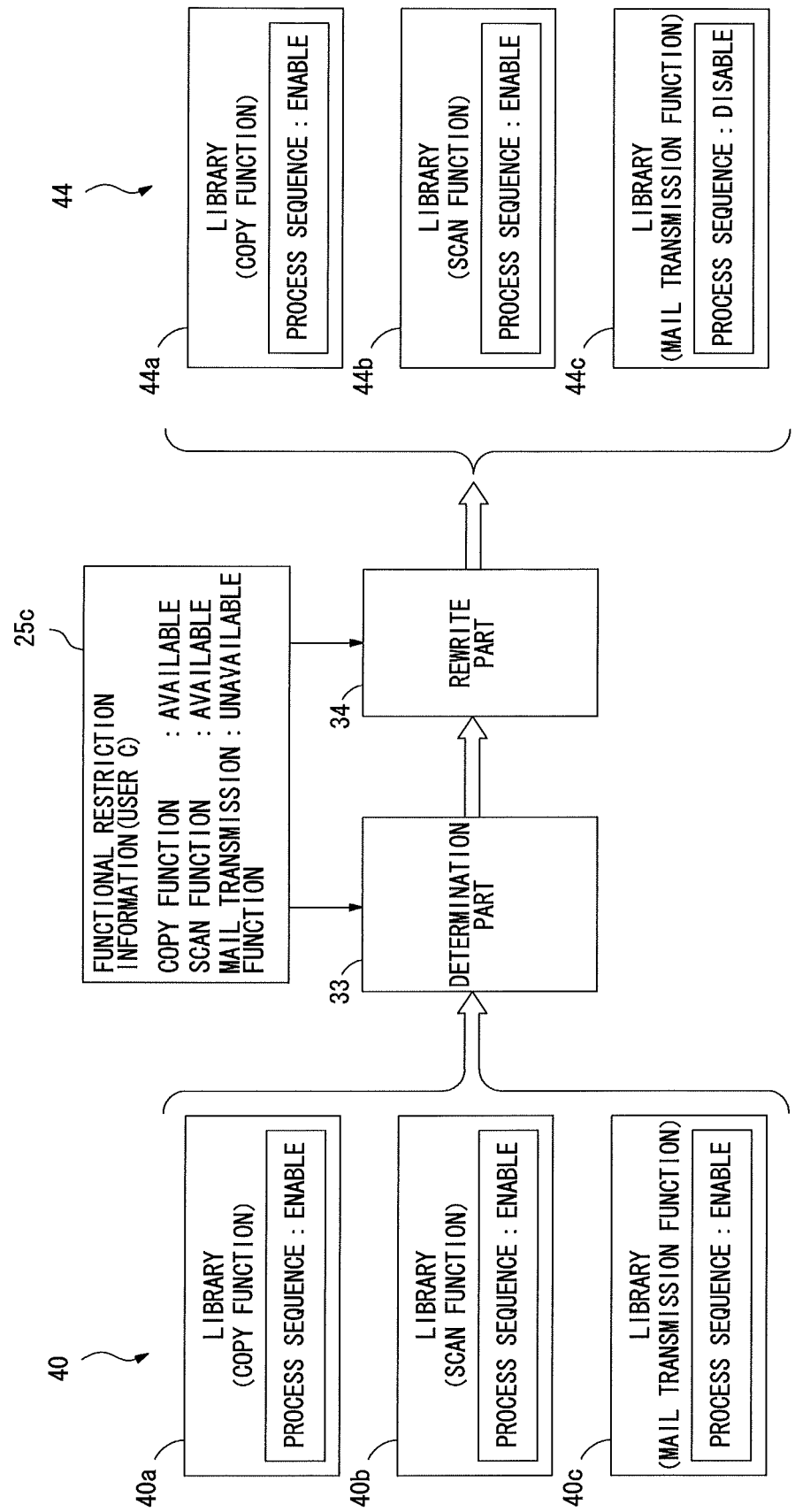
FIG. 16 shows the concept of libraries installed on a user folder of user C.

FIG. 16 shows the concept of the libraries 44 installed on the user folder 23c of the user C. As shown in FIG. 16, the determination part 33, in installation of the libraries 40 on the user folder 23c of the user C, reads his or her functional restriction information 25c. The determination part 33 determines whether or not each of the libraries 40a, 40b and 40c included in the libraries 40 contains the command allowing the function restricted with the functional restriction information 25c to operate. By referring to FIG. 16, the functional restriction information 25c of the user C shows the use of the mail transmission function is restricted. The library 40c corresponding to the mail transmission function contains the command allowing the function restricted with the functional restriction information 25c to operate.

The rewrite part 34 is next put into operation to function to rewrite the command contained in the library 40c. The command defined to execute the process sequence in the library 40c is rewritten to disable. By way of example, by replacing the command capable of executing the process sequence in the library 40c with a simple comment, the rewrite part 34 rewrites the command not capable of executing the process sequence. Information showing the process sequence is executed normally as a result of the process may be added newly as the command to send a response to the application program. As a result, the process sequence of allowing the mail transmission function to operate is not executed even when the library 40c is executed by the CPU 10. In the example of FIG. 16, the libraries 40a and 40b contain the commands allowing the function available for the user C to operate, hence, are not rewritten.

The libraries 44 including the library 44c is installed on the user folder 23c of the user C. The included library 44c corresponding to the mail transmission function is rewritten to disable the defined process sequence. So, the libraries 44a and 44c installed on the user folder 23c each is equivalent to each of the libraries 40a and 40b included in the libraries 40 that the installation part 32 received to install, whereas the library 44c, is not equivalent to the library 40c. In this case, the command contained in each of the libraries 44a and 44b still enables the respective functions, and the libraries 44a and 44b are installed. As the CPU 10 reads and executes the libraries 44a and 44b, the respective information processing functions corresponding to the libraries 44a and 44b (that are, the copy function and the scan function) operate normally.

The command contained in the library 44c is rewritten to disable the corresponding function, and the library 44c is installed. The information processing function corresponding to the library 44c (that is, the mail transmission function) does not operate in the information processing device 1 even when the CPU 10 reads and executes the library 44c.

An example of installing the libraries 40 on the respective user folders 23a, 23b and 23c of the users A, B and C is explained above. The above-described concepts are the same as an example of installing the libraries 40 on the shared folder 22. More in detail, the command contained in the libraries 40 is rewritten to match the common functional restriction information 24 when the libraries 40 are installed on the shared folder 22.

The information processing device 1 of the second preferred embodiment, in installation of the libraries 40 on the respective user folders 23a, 23b and 23c of the users A, B and C, creates the libraries 42, 43 and 44 each containing the command rewritten to match the respective functional restriction information 25a, 25b and 25c, and installs the created libraries 42, 43 and 44 on the respective user folders 23a, 23b and 23c separately. In the second preferred embodiment, the application program 8 created by the person such as the programmer may be installed without rewriting the command contained therein. Furthermore, the application program 8 installed on the information processing device 1 may be executed without rewriting the command contained therein.

Figure 17:
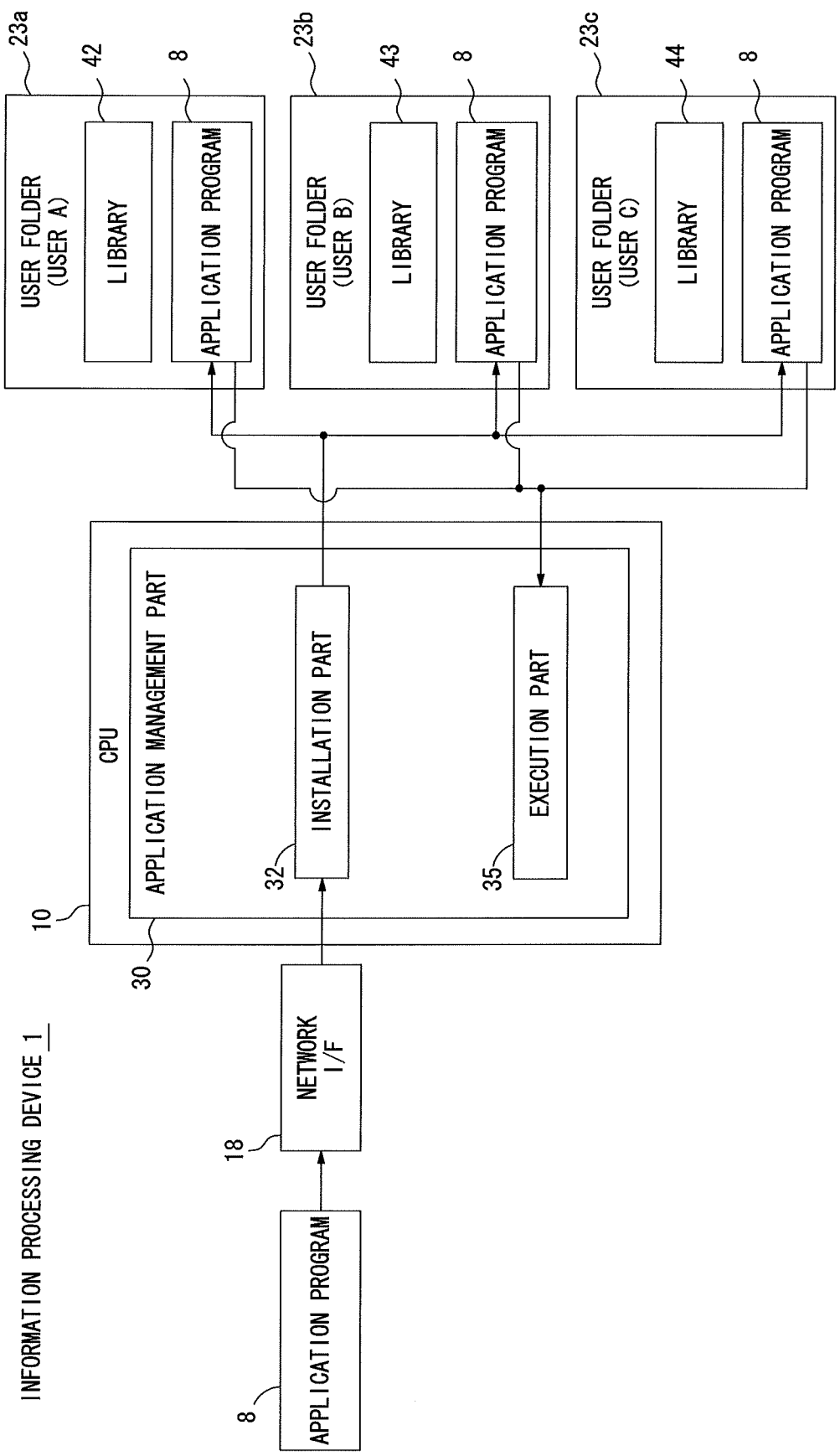
FIG. 17 is a block diagram showing the functional configuration realized in the installation or execution of the application program by the CPU of the information processing device in the second preferred embodiment.

FIG. 17 is a block diagram showing the functional configuration realized in installation or execution of the application program 8 by the CPU 10 of the information processing device 1 in the second preferred embodiment. The CPU 10 executes the application management program 21, so that each part is realized as shown in FIG. 17. In FIG. 17, only the user folders 23a, 23b and 23c corresponding to each user A, B and C are shown, whereas the shared folder 22 commonly used by each user A, B and C, is not shown.

The CPU 10 executes the application management program 21, thereby functioning as the application management part 30 as shown in FIG. 17. The application management part 30 is put into operation to function as the installation part 32 when the application program 8 is installed on the information processing device 1. The application management part 30 also functions as the execution part 35 when the application program 8 installed on the information processing device 1 is executed.

The installation part 32 installs the application program 8 remaining the same as which newly received via the network interface 18 on the respective user folders 23a, 23b and 23c of the users A, B and C. In the second preferred embodiment, the same application program 8 is installed on every user folder 23a, 23b and 23c of each user A, B and C.

The application program 8 of this kind contains the plurality of commands enabling the range of the information processing functions provided by the information processing device 1. The commands reads and executes the libraries 42, 43 and 44 in the respective user folders 23a, 23b and 23c as explained in the first preferred embodiment. The libraries 42, 43 and 44 in the respective user folders 23a, 23b and 23c contain the commands already rewritten to match the functional restriction information 25a, 25b or 25c corresponding to the user A, B or C in the second preferred embodiment. Therefore, the command contained in the application program 8 is not needed to be rewritten in installation of the application program 8 compared to the first preferred embodiment. The installation may be executed efficiently.

In response to the instruction on execution of the application program 8 by the logged-in user, the execution part 35 of the application management part 30 is put into operation to function. The execution part 35 of the second preferred embodiment reads the application program 8, in the user folder 23a, 23b or 23c of the logged-in user, selected by the logged-in user, and executes the read application program 8 as it is.

The execution part 35 reads and executes the application program 8 in the user folder 23a of the user A as the logged-in user is the user A, for instance. If the application program 8 in the user folder 23a read and executed contains the command to read and execute the libraries 42, the execution part 35 reads and executes the libraries 42 in the same user folder 23a based on the command. The execution part 35 executes the same process when the logged-in user is the user B or the user C. The execution part 35 reads and executes the libraries 43 or 44 in the user folder 23b or 23c when executing the application program 8 installed on the user folder 23b or 23c.

Thus, the execution part 35 reads and executes the application program 8 in the user folder 23a, 23b or 23c corresponding to the logged-in user. In response to the execution, the information processing device 1 enables at least one information processing function based on the functional restriction information 25a, 25b or 25c of the logged-in user. By way of example, the three functions, the copy functions, the scan function and the mail transmission function, all operate when the logged-in user is the user A. The two functions, the copy function and the mail transmission function except for the scan function, operate when the logged-in user is the user B. The two functions, the copy function and the scan function except for the mail transmission function, operate when the logged-in user is the user C.

In the second preferred embodiment as described above, the command contained in the application program 8 is not needed to be rewritten in execution of the application program 8 by the execution part 35 compared to the first preferred embodiment. The efficient start of execution of the application program 8 may be ensured.

Figure 18:
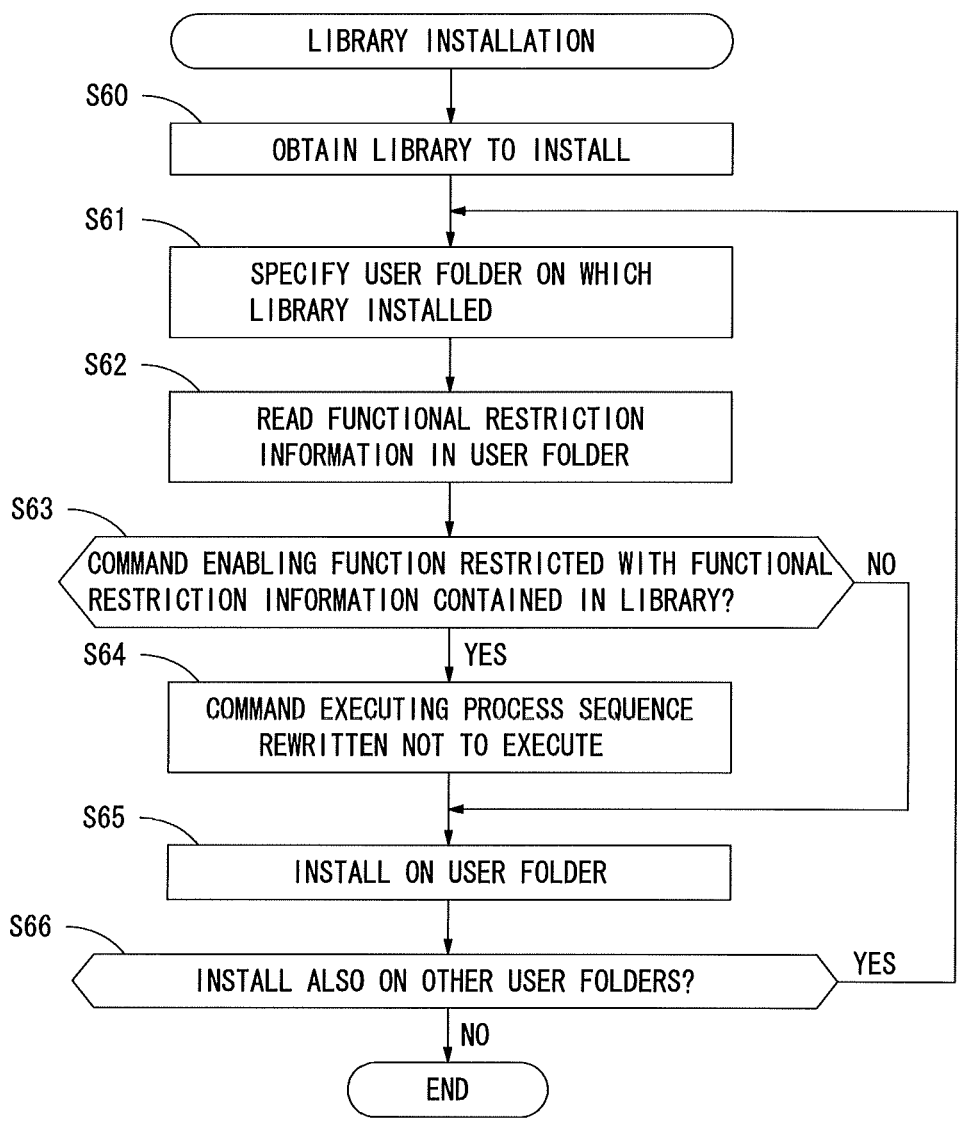
FIG. 18 is a flow diagram explaining an exemplary process sequence executed in the information processing device of the second preferred embodiment.

FIG. 18 is a flow diagram explaining an exemplary process sequence executed in the information processing device 1 of the second preferred embodiment. The flow diagram of FIG. 18 especially shows the process sequence of installing the libraries 40 by the application management part 30. By starting the installation, the CPU 10 receives the libraries 40 to install (step S60). The CPU 10 specifies one of the user folders 23 on which the libraries 40 are installed (step S61), and reads the functional restriction information 25a, 25b or 25c in the specified one of user folders 23 (step S62). The CPU 10 thereafter determines whether or not the command which enables the function restricted with the functional restriction information 25a, 25b or 25c is contained in the libraries (step S63). When a result of the determination shows that the libraries 40 to install contain the command enabling the function restricted with the functional restriction information 25a, 25b or 25c (when a result of step S63 is YES), the command executing the process sequence defined by the libraries 40 is rewritten not to execute the process sequence (step S64). When the result shows that the libraries 40 to install does not contain the command enabling the function restricted with the functional restriction information 25a, 25b or 25c (when a result of step S63 is NO), the command is not rewritten.

The CPU 10 installs the libraries 40 to install on the specified one of user folders 23 (step S65). As the command is rewritten in step S64, the libraries containing the rewritten command are installed. The CPU 10 then determines whether or not to install the same libraries 40 on also the other user folders 23 (step S66). If there still is at least one of user folders 23 on which no libraries 40 are installed yet, the CPU 10 returns to the process in step S61 to execute the above-described process repeatedly. In response to completion of the installation of the libraries 40 on all of the user folders 23 of the users A, B and C, the process is completed. The command contained in the libraries 40 is rewritten based on the common functional restriction information 24 as the libraries 40 is installed on the shared folder 22.

As referred to above, the information processing device 1 of the second preferred embodiment, in installation of the libraries 40, one kind of the programs, on one of the user folders 23 of the specified user, reads the functional restriction information 25a, 25b or 25c in one of the user folders 23 of the specified user. The information processing device 1 then analyzes the commands contained in the libraries 40, thereby determining whether or not the command enabling the function restricted with the functional restriction information 25a, 25b or 25c corresponding to the specified user is contained. When the libraries 40 to be installed contain the command enabling the function restricted with the functional restriction information 25a, 25b or 25c corresponding to the specified user, the command contained in the libraries 40 is rewritten to disable the function restricted with the functional restriction information 25a, 25b or 25c. The libraries 40 containing the command rewritten to match the functional restriction information 25a, 25b or 25c is installed on one of the user folders 23 of the specified user.

As described above, the information processing device 1 of the second preferred embodiment reads and executes the libraries 40 installed in advance, thereby installing the application program 8 enabling each of the information processing functions without rewriting the command contained in the application program 8 to install. The information processing device 1 may also execute the installed libraries 40 without rewriting the command contained in the application program 8. The improved process efficiency in installation and execution of the application program 8 is achieved.

According to the second preferred embodiment, the person such as the programmer is less operative burdened when creating the application program 8 as in the first preferred embodiment. Therefore, the user friendliness of the information processing device 1 improves. The administrator is also less operative burdened because the application program 8 created by the programmer does not require test operation.

In the second preferred embodiment, in response to the update of the respective functional restriction information 25a, 25b and 25c of the user A, B and C by the administrator, the CPU 10 puts the determination part 33 and the rewrite part 34 into operation to function. The command contained in the respective libraries 42, 43 and 44 in the user folders 23a, 23b and 23c of the users A, B and C is then rewritten again. As a result, the respective functional restriction information 25a, 25b and 25c updated by the administrator is reflected on the libraries 42, 43 and 44 in each of the user folders 23a, 23b and 23c.

(Modifications)

While the preferred embodiments of the present invention have been described above, the present invention is not limited to the preferred embodiments. Various modifications may be applied to the present invention.

In the preferred embodiments described above, the information processing device 1 is shown to be a device with multiple functions such as an MFP. The multiple functions include, for example, the copy function, the print function, the scan function, the fax function and the mail transmission function. The device is not necessarily the device such as the MFP. To be more specific, the information processing device 1 may be a device with at least one of the above-cited multiple functions or a device with another information processing function besides the copy function, the print function, the scan function, the fax function and the mail transmission function.

In the above-described present preferred embodiments, the information processing device 1 receives the program to install through the network 4. The manner of receiving the program is not limited to this. The information processing device 1, however, may read and install the program in a recording medium on which the program to install is recorded.

Furthermore, in the preferred embodiments described above, the application management program 21 allowing the CPU 10 to function as the application management part 30 is installed in advance on the information processing device 1. However, the application management program 21 may be exchanged with being stored on the computer readable recording medium, for example.

What is claimed is:

1. An information processing device for installing and executing an application program which enables at least one of a plurality of information processing functions provided with said information processing device, comprising:

a storage part for storing functional restriction information for each of a plurality of users which shows a functional restriction for each user on use of said plurality of information processing functions, said storage part including a shared storage region commonly available for the plurality of users, and a user storage region assigned for each of the plurality of users individually;

an obtaining part for obtaining, based on said functional restriction information for each user, common functional restriction information which shows that said plurality of information processing functions are unavailable except for a function commonly available for all of the plurality of users;

a determination part, in installation of said application program, for determining whether or not a command contained in said application program enables an unavailable function shown by said common functional restriction information by analyzing the command;

a rewrite part for rewriting the command contained in said application program to disable said unavailable function shown by said common functional restriction information when the command is determined to enable said unavailable function;

an installation part for installing said application program containing the command rewritten by said rewrite part;

said shared storage region stores a library in which execution of a functional process to effectively enable at least one of said plurality of information processing functions is defined and a dummy library in which execution of a dummy process executed to replace said functional process without enabling at least one of said plurality of information processing functions is defined, and said rewrite part rewrites the command to execute said library contained in said application program to be installed as the command to execute said dummy library, thereby rewriting the command to disable said unavailable function restricted with said common functional restriction information when the command enabling said unavailable function restricted with said common functional restriction information is contained in said application program.

2. The information processing device according to claim 1, further comprising:

an execution part for reading and executing said application program installed by said installation part in response to an instruction of a specified user, wherein said determination part, in execution of said application program by said execution part, reads said functional restriction information corresponding to said specified user and analyzes the command contained in said application program, thereby determining whether or not the command is rewritten by said rewrite part to disable a specific function available for said specified user, said rewrite part rewrites the command contained in said application program to enable said specific function to be available for said specified user when the command is rewritten to disable said specific function, and said execution part executes said application program containing the command rewritten by said rewrite part to enable said specific function to be available for said specified user.

3. The information processing device according to claim 2, wherein said installation part installs said application program containing the command rewritten by said rewrite part to disable said unavailable function restricted with said common functional restriction information on said shared storage region, and said execution part stores said application program containing the command rewritten by said rewrite part to enable said specific function to be available for said specified user in said user storage region corresponding to said specified user and executes said application program thereby stored.

4. The information processing device according to claim 1, wherein said user storage region stores a library in which execution of a functional process to effectively enable at least one of said plurality of information processing functions is defined and a dummy library in which execution of a dummy process executed to replace said functional process without enabling at least one of said plurality of information processing functions is defined, and said rewrite part rewrites the command to execute said dummy library contained in said application program to be executed as the command to execute said library, thereby rewriting the command to enable said specific function to be available for said specified user when the command is rewritten to disable said specific function to be unavailable for said specified user.

5. The information processing device according to claim 3, further comprising:

an update part for updating said functional restriction information in said storage part, wherein said rewrite part reads said application program in said user storage region of at least one user of the plurality of users and rewrites the command contained in said application program to match said functional restriction information updated by said update part when said functional restriction information corresponding to said at least one user is updated by said update part.

6. An information processing device for installing and executing a program which enables at least one of a plurality of information processing functions provided with said information processing device, comprising:

a storage part for storing functional restriction information for each of a plurality of users which shows a functional restriction for each user on use of said plurality of information processing functions, said storage part including a shared storage region commonly available for the plurality of users, and a user storage region assigned for each of the plurality of users individually;

a determination part for determining, when installing a library to be associated with a specified user of said plurality of users on said storage part where the library defines a process sequence effectively enabling at least one of said plurality of information processing functions, whether or not a command contained in said library enables a specific function restricted with said functional restriction information corresponding to said specified user by analyzing the command;

a rewrite part for rewriting the command contained in said library to disable said specific function restricted with said functional restriction information corresponding to said specified user when the command is determined to enable said specific function;

an installation part for installing said library containing the command rewritten by said rewrite part to be associated with said specified user on said storage part and further installing said program to be associated with said specified user on said storage part, said program including a command reading said library, and executing said process sequence defined in said library;

said shared storage region stores a library in which execution of a functional process to effectively enable at least one of said plurality of information processing functions is defined and a dummy library in which execution of a dummy process executed to replace said functional process without enabling at least one of said plurality of information processing functions is defined, and said rewrite part rewrites the command to execute said library contained in said application program to be installed as the command to execute said dummy library, thereby rewriting the command to disable said unavailable function restricted with said functional restriction information corresponding to said specified user when the command enabling said unavailable function restricted with said common functional restriction information is contained in said application program.

7. An information processing method of installing and executing an application program which enables at least one of a plurality of information processing functions, comprising the steps of:

(a) storing functional restriction information for each of a plurality of users which shows a functional restriction for each user on use of said plurality of information processing functions, the plurality of users having a shared storage region commonly available, the plurality of users having a plurality of user storage regions where one of the plurality of user storage regions is assigned for each of the users;

(b) obtaining, based on said functional restriction information for each user, common functional restriction information which shows that said plurality of information processing functions are unavailable except for a function commonly available for all of the plurality of users;

(c) determining, in installation of said application program, whether or not a command contained in said application program enables an unavailable function shown by said common functional restriction information by analyzing the command;

(d) rewriting the command contained in said application program to disable said unavailable function shown by said common functional restriction information when the command is determined to enable said unavailable function;

(e) installing said application program containing the command rewritten to disable said unavailable function restricted with said common functional restriction information;

said shared storage region stores a library in which execution of a functional process to effectively enable at least one of said plurality of information processing functions is defined and a dummy library in which execution of a dummy process executed to replace said functional process without enabling at least one of said plurality of information processing functions is defined, and said step (d) rewrites the command to execute said library contained in said application program to be installed as the command to execute said dummy library, thereby rewriting the command to disable said unavailable function restricted with said common functional restriction information when the command enabling said unavailable function restricted with said common functional restriction information is contained in said application program.

8. The information processing method according to claim 7, further comprising the steps of:

(f) reading said installed application program in response to an instruction on execution given by a specified user;

(g) reading said functional restriction information corresponding to said specified user and analyzing the command contained in said application program, thereby determining whether or not the command is rewritten to disable a specific function available for said specified user;

(h) rewriting the command contained in said application program to enable said specific function to be available for said specified user when the command is rewritten to disable said specific function, and (i) executing said application program containing the command rewritten to enable said specific function to be available for said specified user.

9. The information processing method according to claim 8, wherein said application program containing the command rewritten in said step (d) to disable said unavailable function restricted with said common functional restriction information is installed on the shared storage region commonly available for the plurality of users in said step (e), and said application program containing the command rewritten in said step (h) to enable said specific function to be available for said specified user is stored in the user storage region, corresponding to said specified user, said application program thereby stored is executed in said step (f).

10. The information processing method according to claim 7, wherein said user storage region stores a library in which execution of a functional process to effectively enable at least one of said plurality of information processing functions is defined and a dummy library in which execution of a dummy process executed to replace said functional process without enabling at least one of said plurality of information processing functions is defined, and said step (h) rewrites the command to execute said dummy library contained in said application program to be executed as the command to execute said library, thereby rewriting the command to enable said specific function to be available for said specified user when the command is rewritten to disable said specific function to be unavailable for said specified user.

11. The information processing method according to claim 9, further comprising the steps of:

(j) updating said functional restriction information stored in said step (a); and (k) reading said application program in said user storage region of at least one user of the plurality of users and rewriting the command contained in said application program to match said functional restriction information updated in said step (j) when said functional restriction information corresponding to said at least one user is updated in said step (j).

12. An information processing method of installing and executing a program which enables at least one of a plurality of information processing functions provided with said information processing device, comprising the steps of:

(a) storing functional restriction information for each of a plurality of users which shows a functional restriction for each user on use of said plurality of information processing functions, the plurality of users having a shared storage region commonly available, the plurality of users having a plurality of user storage regions where one of the plurality of user storage regions is assigned for each of the users;

(b) reading said functional restriction information and analyzing a command contained in a library in which a process sequence effectively enabling at least one of said plurality of information processing functions is defined, for determining whether or not the command enables a specific function restricted with said functional restriction information corresponding to a specified user in installation of said library;

(c) rewriting the command contained in said library to disable said specific function restricted with said functional restriction information corresponding to said specified user when the command is determined to enable said specific function; and (d) installing said library containing the command rewritten to disable said specific function restricted with said functional restriction information and further installing said program to be associated with said specified user, said program including a command reading said library and executing said process sequence defined in said library;

said shared storage region stores a library in which execution of a functional process to effectively enable at least one of said plurality of information processing functions is defined and a dummy library in which execution of a dummy process executed to replace said functional process without enabling at least one of said plurality of information processing functions is defined, and said step (c) rewrites the command to execute said library contained in said application program to be installed as the command to execute said dummy library, thereby rewriting the command to disable said unavailable function restricted with said functional restriction information corresponding to said specified user when the command enabling said unavailable function restricted with said functional restriction information corresponding to said specified user is contained in said application program.

13. A nontransitory computer readable recording medium on which a program is recorded, said program installing and executing an application program enabling at least one of a plurality of information processing functions of an information processing device provided with said information processing device, said program causing said information processing device to execute the steps of:

(a) storing functional restriction information for each of a plurality of users which shows a functional restriction for each user on use of said plurality of information processing functions, the plurality of users having a shared storage region commonly available, the plurality of users having a plurality of user storage regions where one of the plurality of user storage regions is assigned for each of the users;

(b) obtaining, based on said functional restriction information for each user, common functional restriction information which shows that said plurality of information processing functions are unavailable except for a function commonly available for all of the plurality of users;

(c) determining, in installation of said application program, whether or not a command contained in said application program enables an unavailable function shown by said common functional restriction information by analyzing the command;

(d) rewriting the command contained in said application program to disable said unavailable function shown by said common functional restriction information when the command is determined to enable said unavailable function;

(e) installing said application program containing the command rewritten to disable said unavailable function restricted with said common functional restriction information;

said shared storage region stores a library in which execution of a functional process to effectively enable at least one of said plurality of information processing functions is defined and a dummy library in which execution of a dummy process executed to replace said functional process without enabling at least one of said plurality of information processing functions is defined, and said step (d) rewrites the command to execute said library contained in said application program to be installed as the command to execute said dummy library, thereby rewriting the command to disable said unavailable function restricted with said common functional restriction information when the command enabling said unavailable function restricted with said common functional restriction information is contained in said application program.

14. The nontransitory computer readable recording medium according to claim 13, said program causing said information processing device to further execute the steps of:

(f) reading said installed application program in response to an instruction on execution given by a specified user;

(g) reading said functional restriction information corresponding to said specified user and analyzing the command contained in said application program, thereby determining whether or not the command is rewritten to disable a specific function available for said specified user;

(h) rewriting the command contained in said application program to enable said specific function to be available for said specified user when the command is rewritten to disable said specific function, and (i) executing said application program containing the command rewritten to enable said specific function to be available for said specified user.

15. The nontransitory computer readable recording medium according to claim 14, wherein said application program containing the command rewritten in said step (d) to disable said unavailable function restricted with said common functional restriction information is installed on the shared storage region commonly available for the plurality of users in said step (e), and said application program containing the command rewritten in said step (h) to enable said specific function to be available for said specified user is stored in the user storage region, corresponding to said specified user, said application program thereby stored is executed in said step (f).

16. The nontransitory computer readable recording medium according to claim 13, wherein said user storage region stores a library in which execution of a functional process to effectively enable at least one of said plurality of information processing functions is defined and a dummy library in which execution of a dummy process executed to replace said functional process without enabling at least one of said plurality of information processing functions is defined, and said step (h) rewrites the command to execute said dummy library contained in said application program to be executed as the command to execute said library, thereby rewriting the command to enable said specific function to be available for said specified user when the command is rewritten to disable said specific function to be unavailable for said specified user.

17. The nontransitory computer readable recording medium according to claim 15, wherein said program causes said information processing device to further execute the steps of:

(j) updating said functional restriction information stored in said step (a), and (k) reading said application program in said user storage region of at least one user of the plurality of users and rewriting the command contained in said application program to match said functional restriction information updated in said step (j) when said functional restriction information corresponding to said at least one user is updated in said step (j).

18. A nontransitory computer readable recording medium on which a program is recorded, said program installing and executing an application program enabling at least one of a plurality of information processing functions of an information processing device, said program causing said information processing device to execute the steps of:

(a) storing functional restriction information for each of a plurality of users which shows a functional restriction for each user on use of said plurality of information processing functions, the plurality of users having a shared storage region commonly available, the plurality of users having a plurality of user storage regions where one of the plurality of user storage regions is assigned for each of the users;

(b) reading said functional restriction information and analyzing a command contained in a library in which a process sequence effectively enabling at least one of said plurality of information processing functions is defined, for determining whether or not the command enables a specific function restricted with said functional restriction information corresponding to a specified user in installation of said library;

(c) rewriting the command contained in said library to disable said specific function restricted with said functional restriction information corresponding to said specified user when the command is determined to enable said specific function; and (d) installing said library containing the command rewritten to disable said specific function restricted with said functional restriction information and further installing said application program to be associated with said specified user, said application program including a command reading said library and executing said process sequence defined in said library;

said shared storage region stores a library in which execution of a functional process to effectively enable at least one of said plurality of information processing functions is defined and a dummy library in which execution of a dummy process executed to replace said functional process without enabling at least one of said plurality of information processing functions is defined, and said step (c) rewrites the command to execute said library contained in said application program to be installed as the command to execute said dummy library, thereby rewriting the command to disable said unavailable function restricted with said functional restriction information corresponding to said specified user when the command enabling said unavailable function restricted with said functional restriction information corresponding to said specified user is contained in said application program.

* * * * *